(12) United States Patent
Dupree

(10) Patent No.: US 8,135,606 B2
(45) Date of Patent: Mar. 13, 2012

(54) GATHERING DATA CONCERNING PUBLICATION USAGE AND EXPOSURE TO PRODUCTS AND/OR PRESENCE IN COMMERCIAL ESTABLISHMENT

(75) Inventor: Linda Dupree, New York, NY (US)

(73) Assignee: Arbitron, Inc., Columbia, MD (US)

(*) Notice: Subject to any disclaimer, the term of this patent is extended or adjusted under 35 U.S.C. 154(b) by 1634 days.

(21) Appl. No.: 11/105,106

(22) Filed: Apr. 13, 2005

(65) Prior Publication Data

US 2005/0234774 A1    Oct. 20, 2005

Related U.S. Application Data

(60) Provisional application No. 60/562,907, filed on Apr. 15, 2004.

(51) Int. Cl.
*G06Q 10/00* (2006.01)
*G06Q 30/00* (2006.01)

(52) U.S. Cl. .................................................. 705/7.29

(58) Field of Classification Search .................... 705/10, 705/7.29
See application file for complete search history.

(56) References Cited

U.S. PATENT DOCUMENTS

| | | | | |
|---|---|---|---|---|
| 4,659,314 A | 4/1987 | Weinblatt | | 434/236 |
| 4,661,847 A | 4/1987 | Weinblatt | | 358/108 |
| 4,726,771 A | 2/1988 | Weinblatt | | 434/236 |
| 4,781,596 A | 11/1988 | Weinblatt | | 434/236 |
| 4,939,326 A | 7/1990 | Weinblatt | | 200/506 |
| 4,992,867 A | 2/1991 | Weinblatt | | 358/108 |
| 5,019,679 A | 5/1991 | Weinblatt | | 200/508 |
| 5,234,345 A | 8/1993 | Weinblatt | | 434/236 |
| 5,483,276 A | 1/1996 | Brooks et al. | | 348/2 |
| 5,689,238 A | 11/1997 | Cannon, Jr. et al. | | 340/568 |
| 5,764,763 A | 6/1998 | Jensen et al. | | 380/6 |
| 6,232,870 B1 | 5/2001 | Garber et al. | | 340/10.1 |
| 6,600,419 B2 | 7/2003 | Barritz | | 340/572.1 |
| 6,834,251 B1 | 12/2004 | Fletcher | | 702/150 |
| 6,837,427 B2 * | 1/2005 | Overhultz et al. | | 235/382 |
| 6,845,360 B2 | 1/2005 | Jensen et al. | | 704/500 |
| 6,951,305 B2 * | 10/2005 | Overhultz et al. | | 235/487 |
| 6,958,710 B2 | 10/2005 | Zhang et al. | | 340/999 |
| 7,038,619 B2 * | 5/2006 | Percy et al. | | 342/357.07 |
| 2002/0008623 A1 | 1/2002 | Garber et al. | | 340/572.1 |
| 2002/0107727 A1 | 8/2002 | Traub | | 705/14 |
| 2002/0113707 A1 | 8/2002 | Grunes et al. | | 340/572.1 |
| 2002/0180588 A1 | 12/2002 | Erickson et al. | | 340/10.2 |

(Continued)

FOREIGN PATENT DOCUMENTS

EP    0408348 A2    1/1991

(Continued)

OTHER PUBLICATIONS

"Objective Means of Determining Magazine Readership", SRI International, Baer, et al., Jul. 1982, pp. i-45.

(Continued)

*Primary Examiner* — Andre Boyce
(74) *Attorney, Agent, or Firm* — Barnes & Thornburg LLP

(57) ABSTRACT

Methods and systems for measuring and gathering data relating to presence of individuals within commercial establishments, relating to usage of publications by those individuals, and relating to exposure to products by those individuals. Participants in one or more studies carry a portable monitor having a commercial establishment presence detection monitor, a publication usage monitor, and/or a product exposure monitor.

8 Claims, 26 Drawing Sheets

U.S. PATENT DOCUMENTS

| | | | |
|---|---|---|---|
| 2003/0005430 A1 | 1/2003 | Kolessar et al. | 725/9 |
| 2003/0033161 A1 | 2/2003 | Walker et al. | 705/1 |
| 2003/0041303 A1 | 2/2003 | Milton | 715/513 |
| 2003/0122708 A1 | 7/2003 | Percy et al. | 342/357.07 |
| 2003/0163287 A1 | 8/2003 | Vock et al. | 702/187 |
| 2003/0171833 A1 | 9/2003 | Crystal et al. | 700/94 |
| 2004/0015399 A1 | 1/2004 | Maggio | 705/14 |
| 2004/0054627 A1 | 3/2004 | Rutledge | 705/50 |
| 2004/0080452 A1 | 4/2004 | Percy et al. | 342/357.07 |
| 2004/0249497 A1 | 12/2004 | Saigh et al. | 700/216 |
| 2005/0035857 A1 | 2/2005 | Zhang et al. | 340/539.13 |
| 2005/0201826 A1 | 9/2005 | Zhang et al. | 455/404.2 |

FOREIGN PATENT DOCUMENTS

EP 0525947 B1 8/1997

OTHER PUBLICATIONS

"Electro-Mechanical Devices for Recording Readership: Report of a Development Project", Schreiber et al., 1983, pp. cover, 198-199 and 545-556.

"The Magazine Meter—1995: A Report of the Watch Meter System", Douglas et al., 1988, pp. cover, 502-512 and List of Delegates.

* cited by examiner

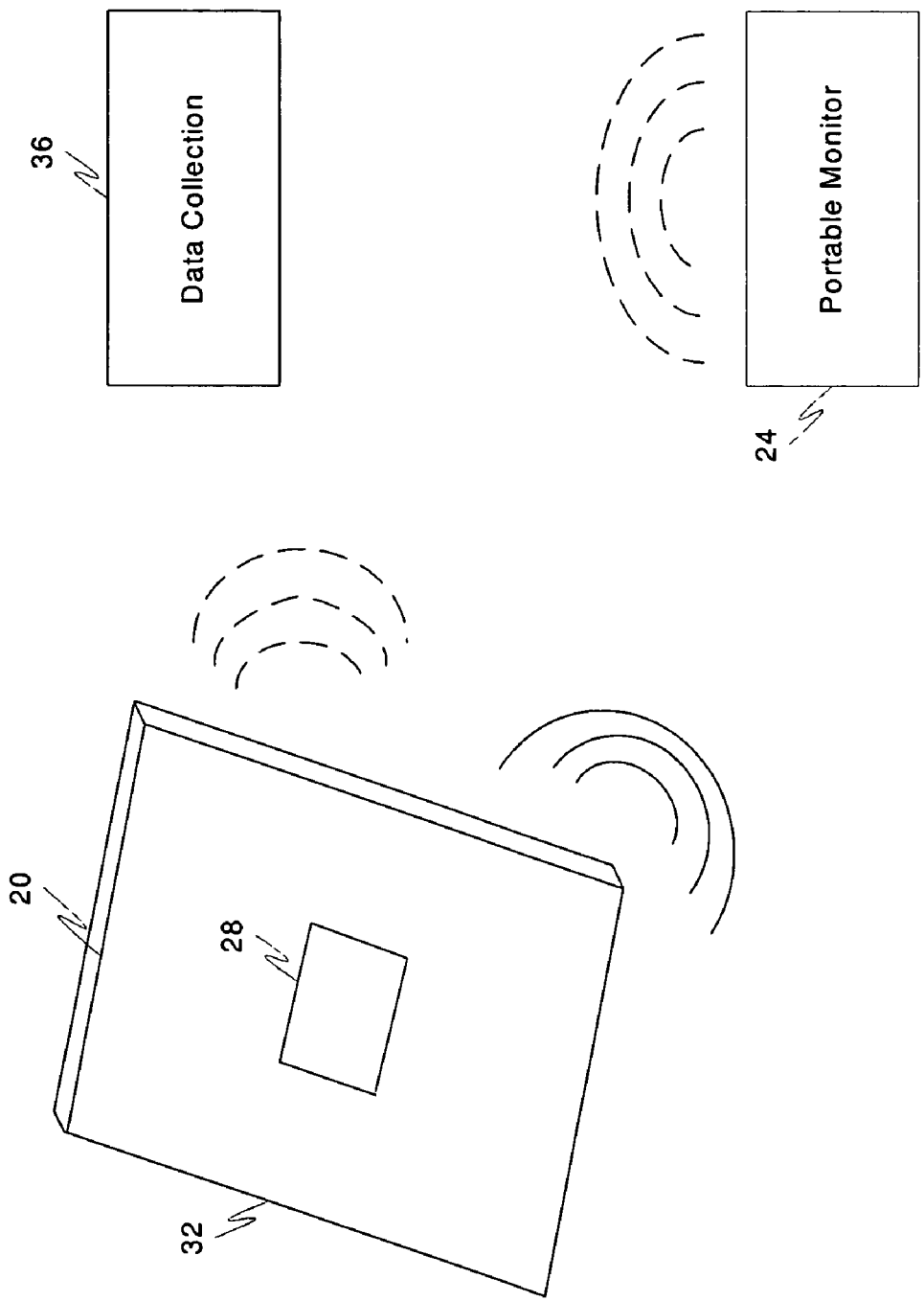

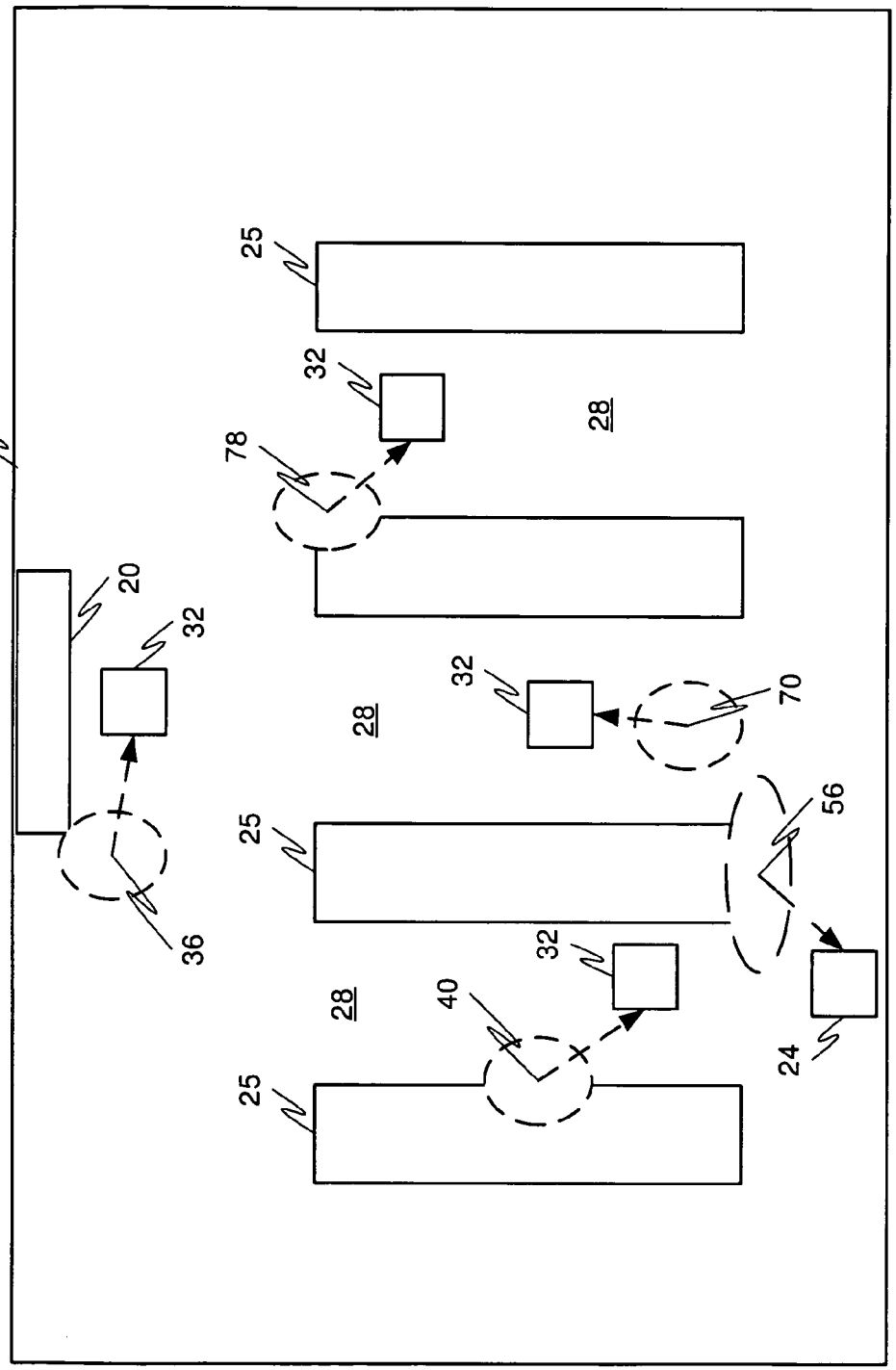

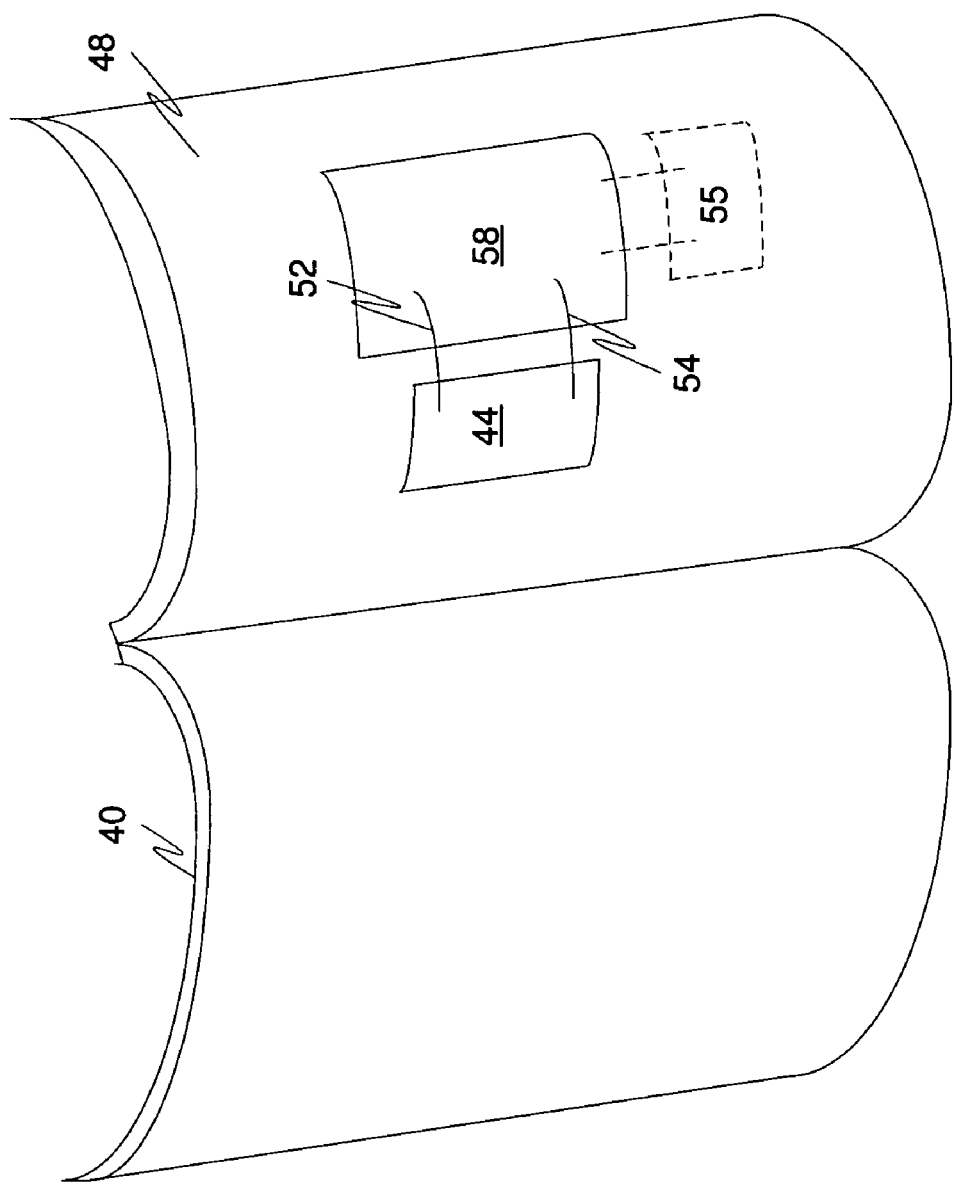

FIGURE 12

| Commercial Establishment ID | Transmitter ID | Panelist ID | Time of Day | Duration |
|---|---|---|---|---|
| Ed's Emporium | 9562 | 1251 | 10:00 | <5 seconds |
| Ed's Emporium | 8723 | 1251 | 10:03 | 20 |
| Ed's Emporium | 2321 | 1251 | 10:04 | 30 |
| Ed's Emporium | 1950 | 1251 | 10:10 | 10 |
| Ed's Emporium | 7878 | 1251 | 10:13 | 30 |
| Ed's Emporium | 9562 | 1251 | 10:20 | <5 |

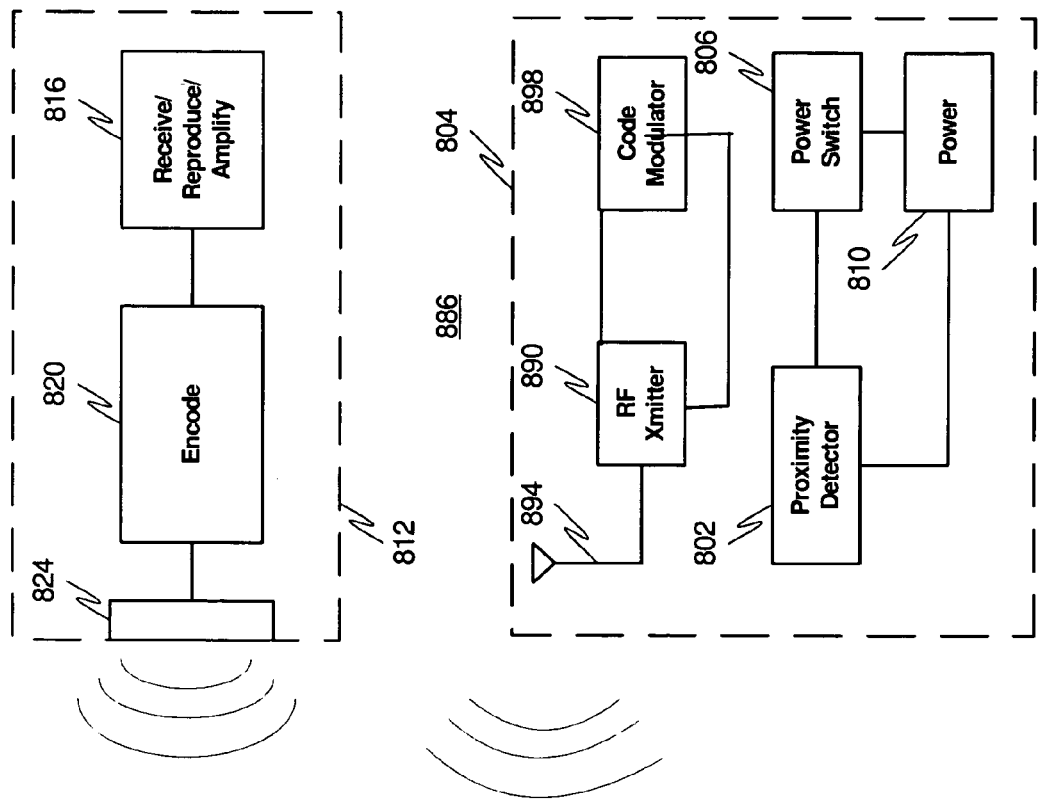
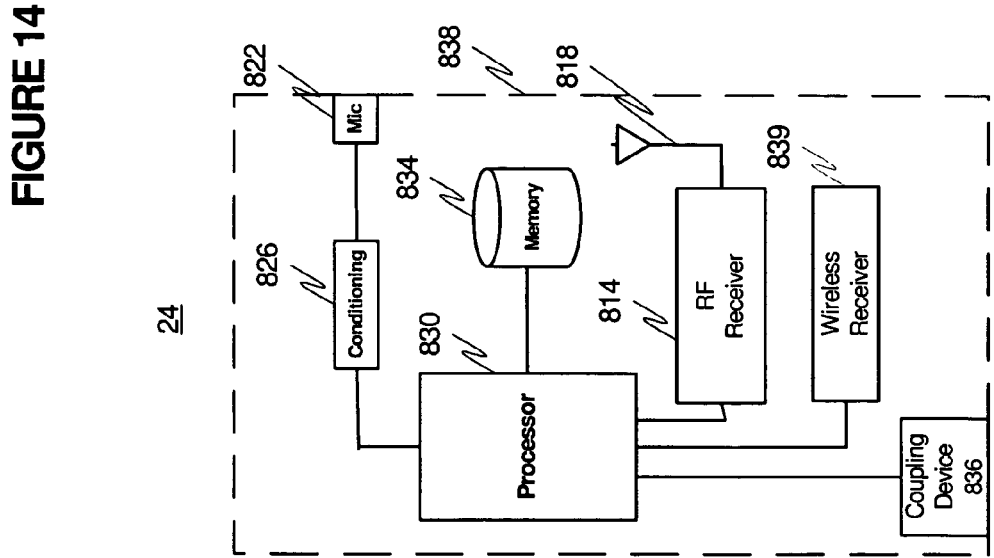
FIGURE 14

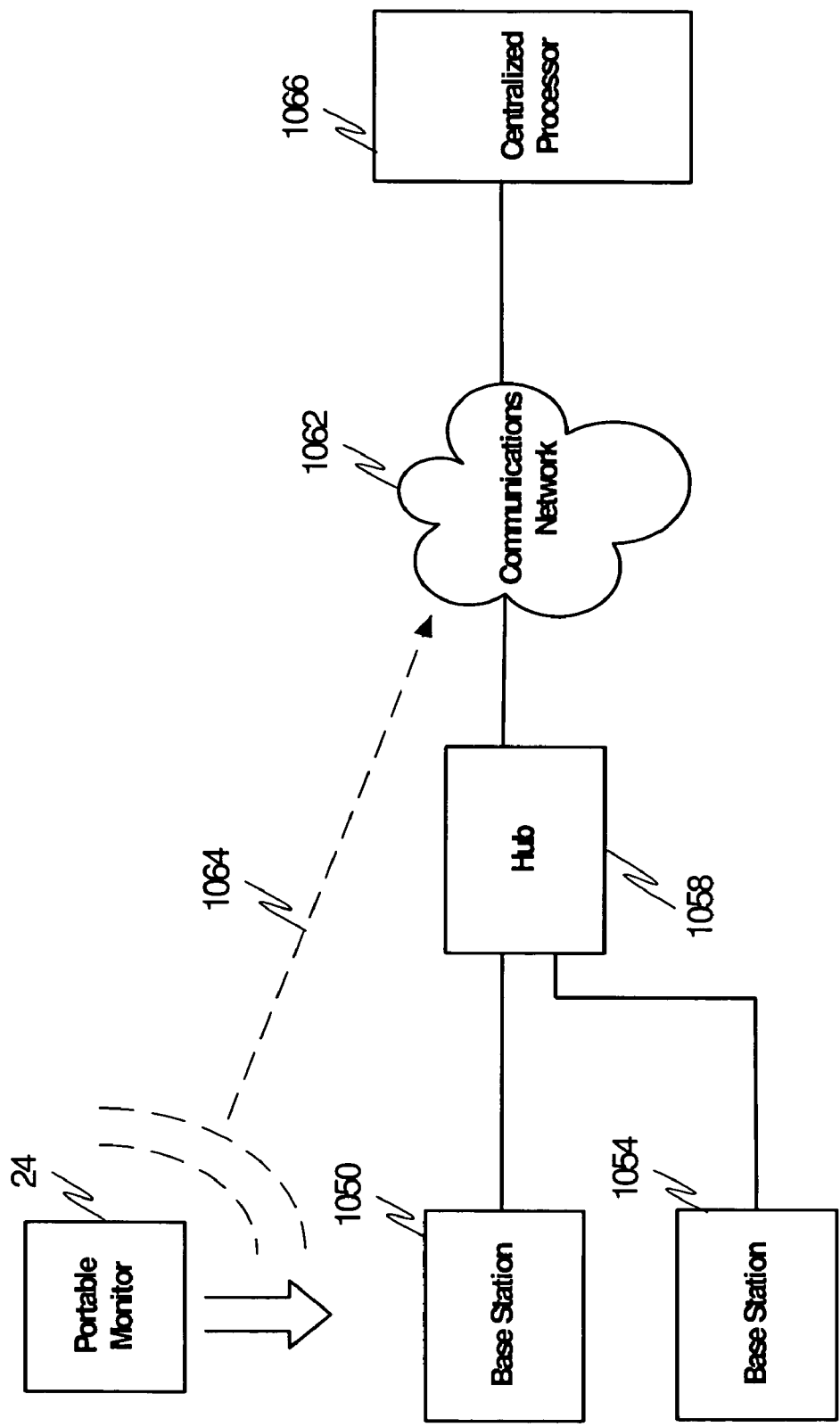

FIGURE 17

| Client | Store | In-Store Location | Transmitter ID | Product and/or Promotional Display | Distributor/ Manufacturer |
|---|---|---|---|---|---|
| Ed's Emporium | Bayville | E1 | 9562 | | |
| Ed's Emporium | Bayville | A1M | 8723 | Champ's Chomp Dog Food | Dog's Best Friend |
| Ed's Emporium | Bayville | A1B | 2321 | Double Whammy Cola | Zap! Distributors |
| Ed's Emporium | Bayville | A2F | 5584 | Glug Beer | F, L & H |
| Ed's Emporium | Bayville | A5F | 1950 | Grim Reaper Bug Spray | W&S |
| Ed's Emporium | Bayville | A6B | 7878 | 4 I's Reading Glasses | Optics-R-Us |
| Wilton Market | Wilton | E1 | 1973 | | |
| Wilton Market | Wilton | A1F | 1987 | Henri's Foi Gras | Swanky Frank's |
| Wilton Market | Wilton | A2B | 4527 | Acme Escargot | Snail's Pace |

FIGURE 20

| Transmitter ID | Panelist ID | Time of Day | Duration |
|---|---|---|---|
| 8723 | 1251 | 10:03 | 20 |
| 2321 | 1251 | 10:04 | 30 |
| 1950 | 1251 | 10:10 | 10 |
| 7878 | 1251 | 10:13 | 30 |

| Client | Store | Transmitter ID | Product | Distributor/Manufacturer |
|---|---|---|---|---|
| Ed's Emporium | Bayville | 8723 | Champ's Chomp Dog Food | Dog's Best Friend |
| Ed's Emporium | Bayville | 2321 | Double Whammy Cola | Zap! Distributors |
| Ed's Emporium | Bayville | 5584 | Glug Beer | F, L & H |
| Ed's Emporium | Bayville | 1950 | Grim Reaper Bug Spray | W&S |
| Ed's Emporium | Bayville | 7878 | 4I's Reading Glasses | Optics-R-Us |
| Wilton Market | Wilton | 1987 | Henri's Foi Gras | Swanky Frank's |
| Wilton Market | Wilton | 4527 | Acme Escargot | Snail's Pace |

1578

GATHERING DATA CONCERNING PUBLICATION USAGE AND EXPOSURE TO PRODUCTS AND/OR PRESENCE IN COMMERCIAL ESTABLISHMENT

RELATED APPLICATION

This application claims the benefit of U.S. provisional patent application Ser. No. 60/562,907, filed Apr. 15, 2004, assigned to the assignee of the present invention and hereby incorporated herein by reference in its entirety.

FIELD OF THE INVENTION

The present invention concerns methods and systems for gathering data on the usage of publications, along with exposure to products and/or presence in a commercial establishment.

BACKGROUND OF THE INVENTION

A wide variety of systems and methods are available to track automatically consumer exposure to certain types of media, including television and radio.

Various other systems and methods are utilized to ascertain consumer presence within commercial establishments. Still yet other techniques are employed to assess consumer exposure to products.

Despite the availability of multiple methods, systems and technologies to track various activities of consumers, further developments are still needed to improve tracking of consumer activity and media exposure, among other things, and to do so in ways that provide even more useful information than currently available.

SUMMARY OF THE INVENTION

For this application the following terms and definitions shall apply:

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The term "database" as used herein means an organized body of related data, regardless of the manner in which the data or the organized body thereof is represented. For example, the organized body of related data may be in the form of a table, a map, a grid, a packet, a datagram, a file, a document, a list or in any other form.

The term "location" as used herein refers to a position relative to a commercial establishment, a product display, a product, another object or facility, or relative to a coordinate system such as latitude and longitude.

The term "layout map" as used herein means a database of data representing locations in a commercial establishment.

The term "publication" as used herein means one or more of a plurality of physical objects disseminated publicly or privately to convey data in printed form to persons, and includes but is not limited to, magazines, newspapers, books, pamphlets, programs, advertising and promotional materials.

The terms "media data" and "media" as used herein mean data which is widely accessible, whether over-the-air, or via cable, satellite, network, internetwork (including the Internet), print, displayed, distributed on storage media, or by any other means or technique that is humanly perceptible, with or without the use of any device or thing, and without regard to the form or content of such data, and including but not limited to audio, video, text, images, animations, databases, datasets, broadcasts, displays, signs, signals, web pages and streaming media data.

The term "network" as used herein includes both networks and internetworks of all kinds, including the Internet, and is not limited to any particular network or inter-network.

The terms "first" and "second" are used to distinguish one element, set, data, object, step, process, activity or thing from another, and are not used to designate relative position or arrangement in time, unless otherwise stated explicitly.

The terms "deformation", "deformed" and "deform" as used herein mean a change of shape or form or the act of changing a shape or form, of a publication or portion thereof, whether permanent or temporary, and whether destructive or non-destructive.

The terms "coupled", "coupled to", and "coupled with" as used herein each mean a relationship between or among two or more devices, apparatus, files, programs, media, components, networks, systems, subsystems, and/or means, constituting any one or more of (a) a connection, whether direct or through one or more other devices, apparatus, files, programs, media, components, networks, systems, subsystems, or means, (b) a communications relationship, whether direct or through one or more other devices, apparatus, files, programs, media, components, networks, systems, subsystems, or means, and/or (c) a functional relationship in which the operation of any one or more devices, apparatus, files, programs, media, components, networks, systems, subsystems, or means depends, in whole or in part, on the operation of any one or more others thereof.

The terms "communicate," "communicating" and "communication" as used herein include both conveying data from a source to a destination, and delivering data to a communications medium, system, device or link to be conveyed to a destination.

The term "processor" as used herein means processing devices, apparatus, programs, circuits, components, systems and subsystems, whether implemented in hardware, software or both.

The terms "storage," "data storage" and "memory" as used herein mean data storage devices, apparatus, programs, circuits, systems, subsystems and storage media serving to retain data, whether on a temporary or permanent basis, and to provide such retained data.

The terms "panelist," "respondent" and "participant" are interchangeably used herein to refer to a person who is, knowingly or unknowingly, participating in a study to gather information, whether by electronic, survey or other means, about that person's behavior or activity or exposure to media.

The term "commercial establishment" as used herein means a physical facility or designated location, whether permanent or temporary in nature, and includes but is not limited to a building, a kiosk, a tent, a booth, a table, place, venue or area where goods, services and/or performances are sold, licensed, rendered, distributed or provided. Exemplary commercial establishments are retail stores, service stations, sports arenas, concert halls, movie theatres, educational facilities, government facilities, community events (e.g., fairs), office buildings, places of business (e.g., medical office) within office buildings, a musical performance (e.g., in an outdoor park), etc.

The terms "position signal" and "location signal" as used herein means a signal from which a position or location can be derived, either in absolute or relative terms, with or without the use of additional position or location signals.

In accordance with an aspect of the present invention, a system is provided for gathering data concerning exposure of an individual to predetermined products and usage of a publication thereby. The system comprises a portable monitor capable of being carried on the person of the individual, the portable monitor comprising a product exposure monitor and a publication usage monitor.

In accordance with a further aspect of the present invention, a system is provided for gathering data concerning presence of an individual within a commercial establishment and usage of a publication thereby. The system comprises a portable monitor capable of being carried on the person of the individual, the portable monitor comprising a commercial establishment presence detection monitor and a publication usage monitor.

In accordance with another aspect of the present invention, a method is provided for gathering data concerning exposure of an individual to a product and usage of a publication thereby. The method comprises gathering data indicating exposure of the individual to at least one product with the use of a portable monitor carried on the person of the individual, and gathering data indicating usage of at least one publication by the individual with the use of the portable monitor.

In accordance with an additional aspect of the present invention, a method is provided for gathering data concerning presence of an individual within a commercial establishment and usage of a publication thereby. The method comprises gathering data indicating presence of the individual within at least one commercial establishment with the use of a portable monitor carried on the person of the individual, and gathering data indicating usage of at least one publication by the individual with the use of the portable monitor.

BRIEF DESCRIPTION OF THE DRAWINGS

FIG. 1A is a schematic illustration of systems used to gather data in accordance with certain embodiments of the present invention.

FIG. 1B is a schematic diagram of a floor of an exemplary commercial establishment for use in illustrating certain embodiments of the present invention.

FIG. 2 is a schematic illustration of a publication containing a piezoelectric transducer in accordance with certain embodiments.

FIG. 12 illustrates a table of a database.

FIG. 14 provides block diagrams of certain embodiments of signal transmitters and a portable monitor arranged to be carried on the person of a panelist participating in a consumer behavior study.

FIG. 16 is a block diagram of a system for downloading data gathered by the portable monitor to a centralized processor.

FIG. 17 illustrates a further table of a database.

FIG. 20 illustrates another table of a database.

FIG. 21 illustrates a further table of a database.

DETAILED DESCRIPTION OF CERTAIN ADVANTAGEOUS EMBODIMENTS

Figure 1C:
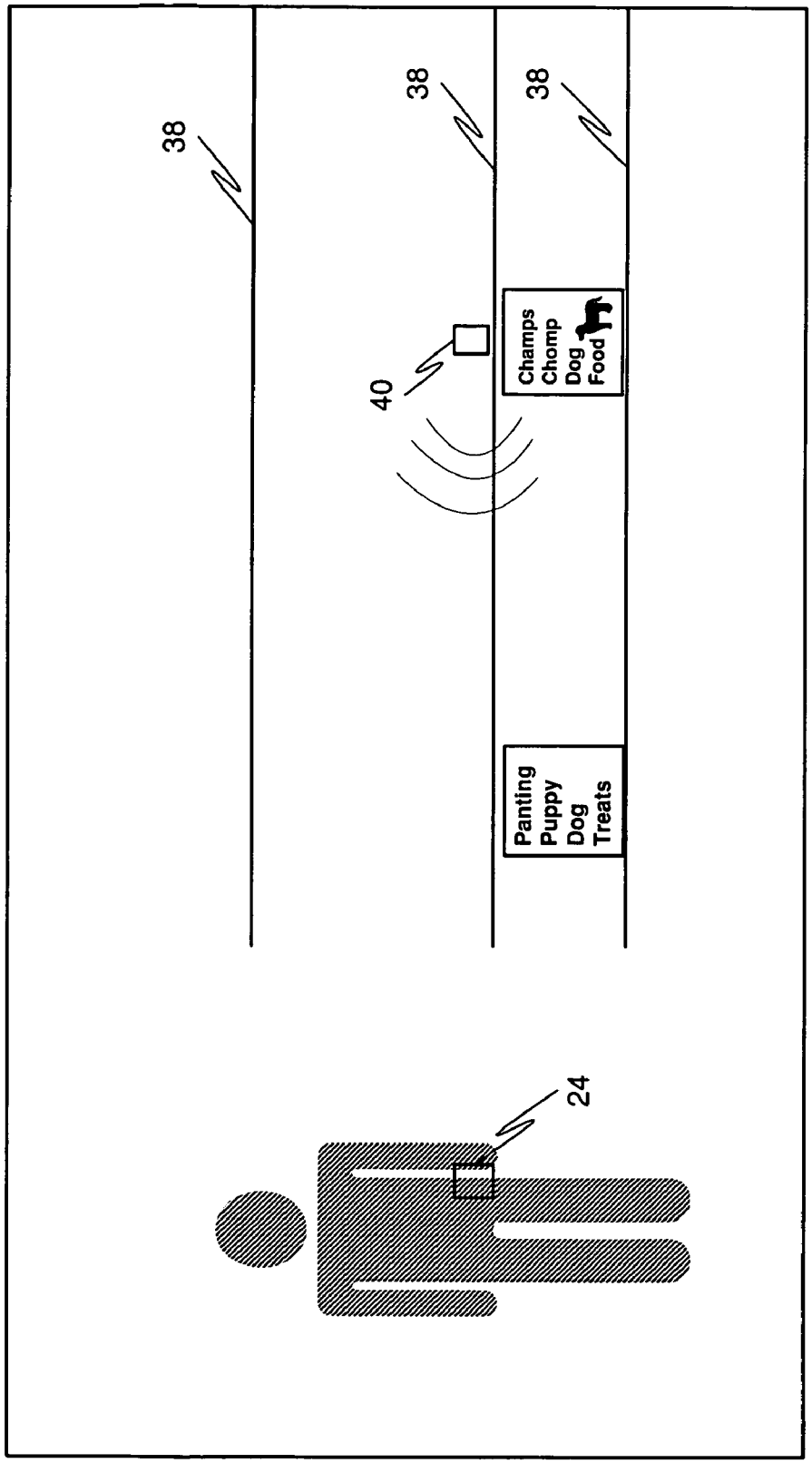
FIG. 1C is a schematic diagram of an aisle of the commercial establishment of FIG. 1B.

FIG. 1A schematically illustrates several embodiments of systems used to gather data concerning usage of a publication by a participant in a publication usage study with the use of a portable monitor 24 carried on the person of the participant. FIG. 1B is a schematic diagram of a floor of a retail store for use in illustrating the use of various embodiments of the monitor 24 to monitor the presence of the participant in the retail store. FIG. 1C is a schematic diagram of an aisle in a retail store for use in illustrating the use of various embodiments of the monitor 24 to monitor exposure of the individual to a product.

Monitoring Usage Of Publications

Various embodiments of the monitor 24 serve to monitor usage of publications by the participant carrying the monitor 24. With reference again to FIG. 1A, the monitor 24 carried on the person of the participant serves to receive and store and/or communicate publication usage data concerning the participant's usage of a publication 20. The publication usage data corresponds to or is based on data wirelessly communicated from a wireless transmitter 28 in or on the publication 20. In certain embodiments, the wireless transmitter 28 is affixed to or carried by a cover of the publication 20, as illustrated in FIG. 1A. In certain embodiments, the wireless transmitter 28 is affixed to or carried by or within a binding or spine 32 of the publication 20. In certain embodiments, the wireless transmitter 28 is affixed to or carried by or in a page, card or other internal component of the publication 20. Certain embodiments employ a plurality of wireless transmitters to communicate data to the portable monitor 24.

In certain embodiments, the wireless transmitter 28 is a radio frequency (RF) transmitter operating at one or more frequencies selected in a range up to microwave frequencies.

In other embodiments, the wireless transmitter 28 transmits infrared, visible light or acoustic energy.

In certain embodiments, usage data is communicated from wireless transmitter 28 to a data collection device or system 36 instead of or in addition to portable monitor 24. In certain ones of such embodiments, the wireless transmitter 28 communicates with a base station located in a participant's household to convey data pertaining to the publication. The base station in turn communicates such data to a centralized processor (not shown for purposes of simplicity and clarity) in order to enable preparation of reports concerning publication usage. Advantageously, the base station is of the kind disclosed in U.S. Pat. No. 5,483,276 in the names of Brooks, et al., assigned to the assignee of the present application and incorporated herein in its entirety by reference. The base station also provides the ability to download data from the portable monitor 24 to the centralized processor.

In certain embodiments, the portable monitor 24 communicates data to the data collection device or system 36, such as participant data or previously stored usage data. Data received or produced by, monitor 24 and/or data collection device or system 26 is communicated thereby to a centralized processor (not shown for purposes of simplicity and clarity) in order to enable preparation of reports concerning publication usage.

A system for producing data concerning usage of a publication by a person comprises a piezoelectric transducer in or on the publication and a wireless transmitter coupled with the piezoelectric transducer. The piezoelectric transducer produces data indicating usage of the publication and provides the data to the wireless transmitter, which transmits the data to a data monitor.

A method for producing data concerning usage of a publication by a person comprises producing usage data indicating usage of the publication by means of a piezoelectric transducer in or on the publication and wirelessly communicating the usage data to a data collector.

FIG. 2 schematically illustrates an embodiment of a publication usage data producing system which serves to produce data concerning usage of a publication 40 by a participant in a publication usage study. In the FIG. 2 embodiment, a piezoelectric transducer 44 is affixed to or carried by a page 48 of the publication 40. When the page 48 of the publication 40 is flexed, as by turning page 48, the piezoelectric transducer 44 is also flexed so that it produces an electrical signal which it provides at leads 52 and 54. Leads 52 and 54 are connected with a wireless transmitter 58 which responds by transmitting a wireless signal containing data based on the output of the piezoelectric transducer 44, for reception by a portable monitor such as monitor 24 of FIG. 1A or a different data collector.

In certain embodiments, the transducer 44 comprises a piezoelectric polymer film on or in the page 48, so that as page 48 is flexed the film is stressed to produce a corresponding electrical signal supplied by leads 52 and 54 to wireless transmitter 58. Wireless transmitter 58 in certain embodiments processes the signal, for example, to suppress noise. In other embodiments, the wireless transmitter 58 communicates the signal essentially as is to a monitor or data collector. In certain embodiments, the transducer 44 supplies power to enable the transmitter 58 to transmit its wireless signal.

A motion detector, such as accelerometer 55, is provided in certain embodiments to detect motion of the publication indicating that it may be in use. The motion detector provides an enable signal to transmitter 58 when the motion detector detects sufficient motion to infer that the publication is in use, and the transmitter 58 is thereupon enabled to transmit its signal.

Figure 3:
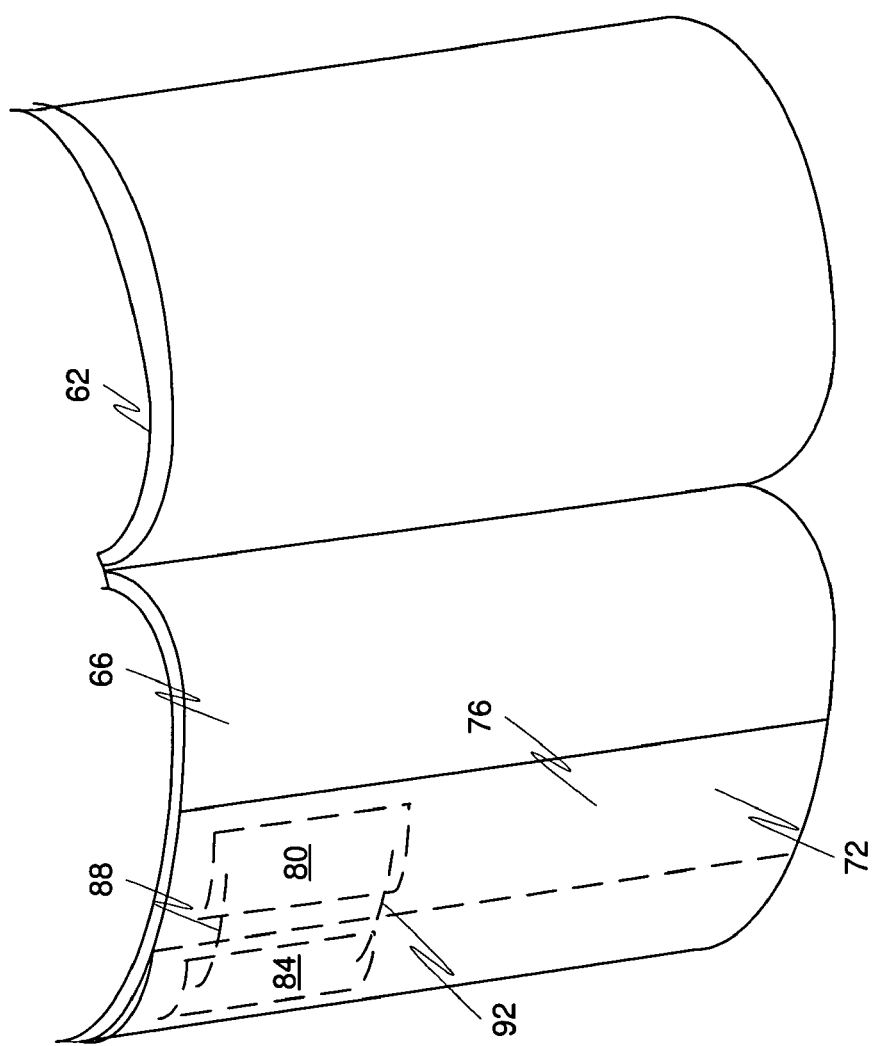
FIG. 3 is a schematic illustration of a publication containing a foldable flap.

FIG. 3 provides a schematic illustration of a publication 62 having a page 66 including an outer flap 72 folded back on the page 66 to conceal content, such as an advertisement, or to contain a sample of a fragrance. Flap 72 is affixed to page 66 in a region 76 by a light adhesive which permits the flap 72 to be separated by a reader from the page 66 without damaging either the flap 72 or the page 66. A piezoelectric transducer 80 comprising a piezoelectric element, such as a piezoelectric polymer film, sandwiched between page 66 and region 76 is subjected to stress when flap 72 is separated from page 66. In response to the stress the transducer 80 produces an electrical signal which it provides to a wireless transmitter 84 coupled thereto by leads 88 and 92. Wireless transmitter 84 either processes the signal and transmits it wirelessly or else communicates it substantially as is to a monitor or data collector. In certain embodiments, the transducer 80 supplies power to enable the transmitter 84 to transmit its wireless signal.

An apparatus for facilitating the collection of data in a publication readership study comprises a piezoelectric element in or on a predetermined portion of a publication, the piezoelectric element being operative to produce electrical energy when deformed; and a wireless transmitter disposed in or on the publication and coupled with the piezoelectric element, the wireless transmitter being responsive to the electrical energy generated by the deformed piezoelectric element to transmit data concerning usage of the publication.

Figure 4:
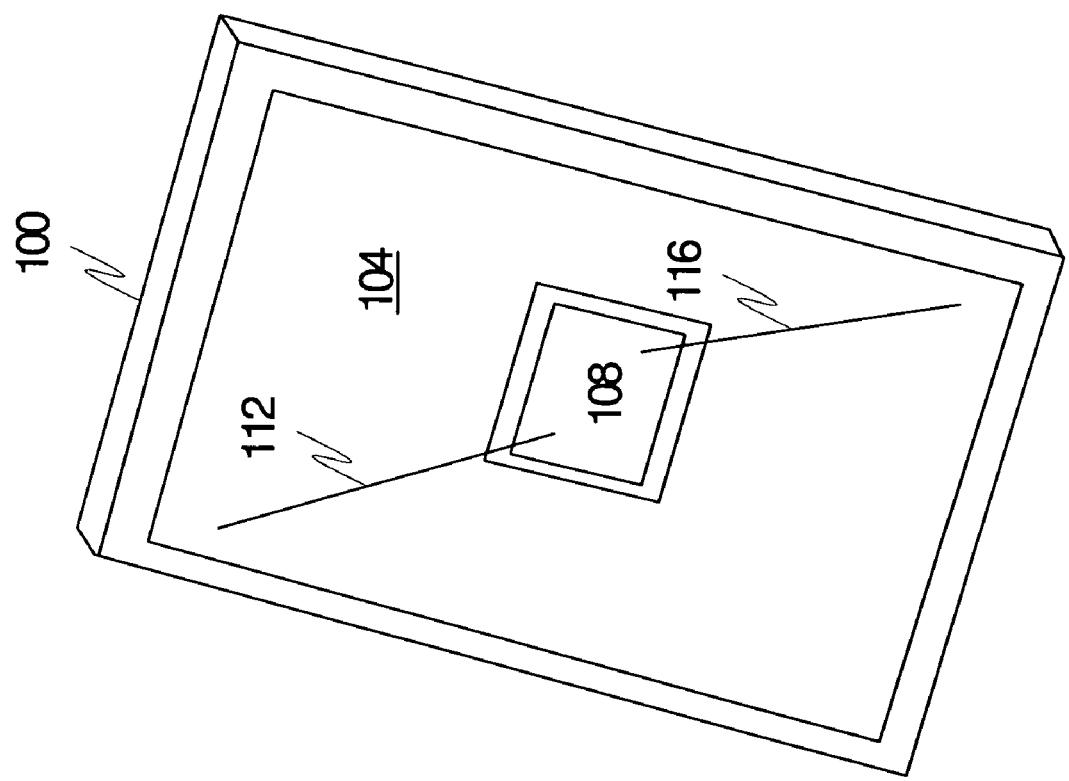
FIG. 4 is a schematic illustration of a publication having a cover on or in which a piezoelectric transducer is placed.

FIG. 4 schematically illustrates a publication 100 having a cover on which a piezoelectric transducer is placed to detect that a reader has grasped the publication 100, in order to indicate usage thereof. The piezoelectric transducer comprises a piezoelectric polymer film 104 in or on the cover of publication 100. In certain embodiments the film 104 is used to detect the stress caused by grasping the publication, while in others it serves to detect a temperature change due to heat from the reader's fingers. In certain embodiments a piezoelectric sensor comprises a ceramic element.

In certain advantageous embodiments, the film 104 is used to detect both stress and body heat in order to improve the likelihood of correctly detecting grasping of the publication by a user. Since the electrical signal produced by the film in response to body heat differs from that produced due to the stress of grasping the publication, the two effects can be separately detected, for example, based on the frequency content of the signal produced by the film 104.

The film 104 is coupled with a wireless transmitter 108 via leads 112 and 116 to supply its electrical signal thereto. In certain embodiments, the leads 112 and 116 comprise electrically conductive media, such as conductive ink, disposed on the cover. In certain embodiments, transmitter 108 processes the signal, for example, to reduce noise or else to detect components therein indicating stress and/or temperature change. The transmitter 108 either wirelessly transmits the processed signal to a monitor or other data collector, or transmits the signal received from the transducer substantially unchanged. In certain embodiments, the film 104 supplies power to enable the transmitter 108 to transmit its wireless signal.

Figure 4A:
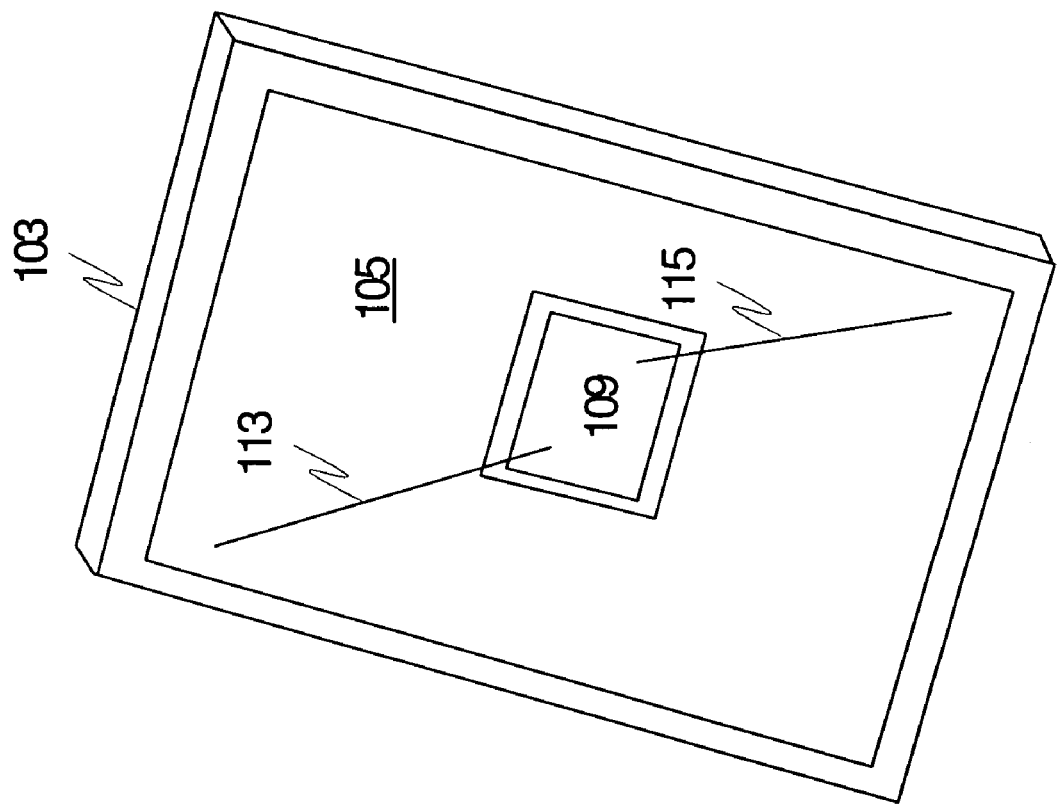
FIG. 4A is another schematic illustration of a publication having a piezoelectric transducer.

FIG. 4A schematically illustrates a package 103 containing a publication (not shown for purposes of simplicity and clarity) on which a piezoelectric transducer 105 is placed. The piezoelectric transducer 105 comprises a piezoelectric polymer film in or on the package 103. The film detects the stress resulting from removing the package 103 from the publication.

The transducer 105 is coupled with a wireless transmitter 109 via leads 113 and 115 to supply its electrical signal thereto. In certain embodiments, the leads 113 and 115 comprise electrically conductive media, such as conductive ink, disposed on the cover. In certain embodiments, transmitter 109 processes the signal, for example, to reduce noise or else to detect components therein indicating stress and/or temperature change. The transmitter 109 either wirelessly transmits the processed signal to a monitor or other data collector, or transmits the signal received from the transducer substantially unchanged. In certain embodiments, the transducer 105 supplies power to enable the transmitter 109 to transmit its wireless signal.

A method of monitoring use of a publication by a person comprises detecting grasping of the publication by the person; and producing usage data indicating use of the publication by the person in response to the detected grasping of the publication. In certain embodiments, the method comprises detecting thermal energy received by the publication and producing usage data indicating use of the publication by the person in response to detecting the thermal energy. In certain embodiments, the method comprises detecting alteration of an electric characteristic of a sensor and producing usage data indicating use of the publication by the person in response to detecting the alteration of an electric characteristic. In certain embodiments the method comprises detecting grasping pressure received by the publication and producing usage data indicating use of the publication by the person in response to detecting the grasping pressure.

A method for monitoring use of a publication by a person comprises detecting proximity of a person to a publication and producing usage data indicating use of the publication by the person in response to detecting proximity of the person to the publication. In certain embodiments, proximity is detected by electric field effects produced by the person's body. In certain embodiments proximity is detected through alteration of an electric characteristic of a sensor in or on the publication. In certain embodiments, proximity is detected based on thermal energy received by a transducer in or on the publication. In certain embodiments, a piezoelectric transducer comprising a piezoelectric polymer film is placed in or on a publication to detect body heat due to the presence of a user, with or without detecting grasping of the publication thereby, and supplies a resulting signal to a wireless transmitter for communication to a monitor or other data collector.

A system for producing data indicating use of a publication by a person comprises a proximity detector operative to detect that a person's body is proximal to the publication and a wireless transmitter coupled with the proximity detector to wirelessly communicate a signal containing data indicating a detected proximity of the person's body.

A method of gathering data concerning usage of a publication by a person comprises detecting thermal energy from a person's body by means of a thermal energy sensor in or on a publication to produce thermal energy data and producing usage data indicating use of the publication by the person based on the thermal energy.

Figure 5:
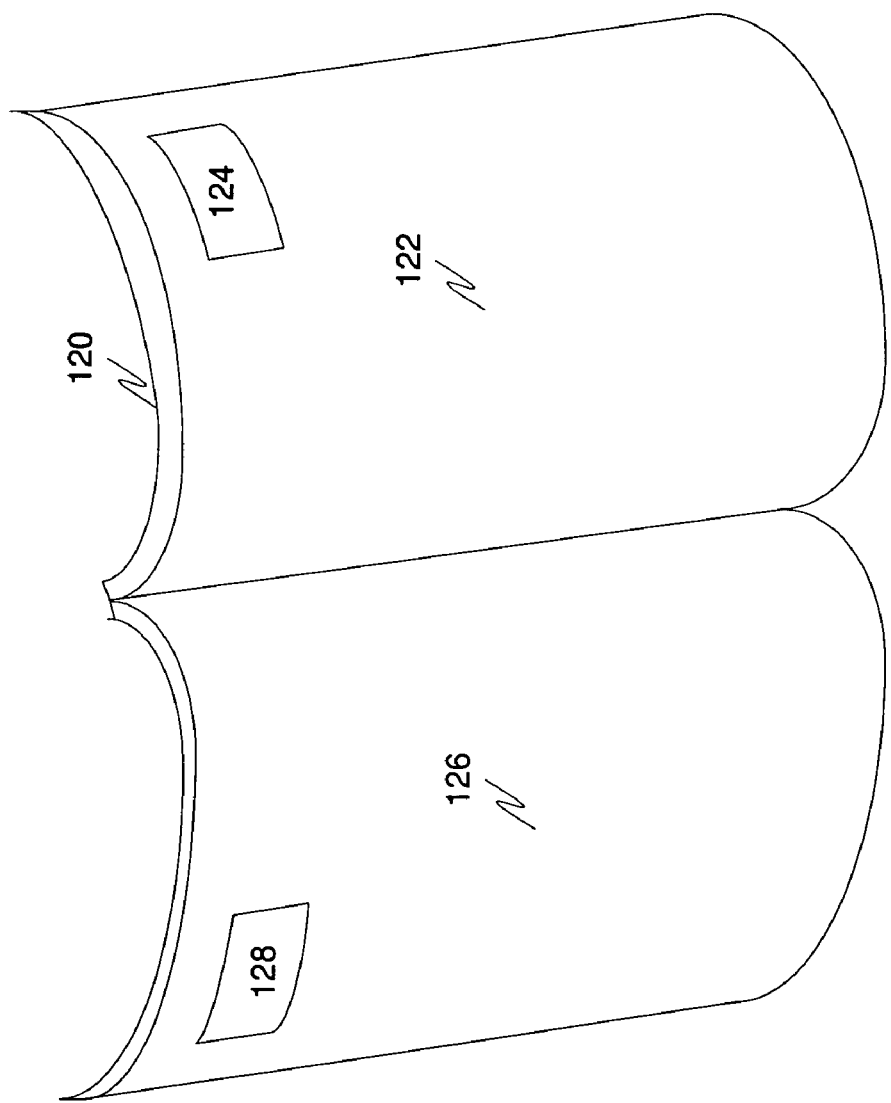
FIG. 5 is a further schematic illustration of a publication.

FIG. 5 schematically illustrates a publication 120 open at a page 122. A wireless transmitter 124 is disposed in or on the page 124 and is operative to transmit a signal wirelessly indicating usage of the publication to the monitor 24 by opening it at page 122. A page 126 of publication 120 faces page 122. A device 128 is disposed in or on page 126 and positioned so that it is brought sufficiently close to wireless transmitter 124 when pages 122 and 124 are closed against one another, so that device 128 thereupon interacts wirelessly with transmitter 124 to establish a first state of transmitter 124, but so that when pages 122 and 126 are separated from one another upon opening the publication between these pages, a second state of transmitter 124 is then established. In certain embodiments, transmitter 124 is maintained in a non-transmit mode when in its first state, but switches to a transmit mode when in its second state. In such embodiments, a portable monitor or other data collector receives a transmission from transmitter 124 as an indication that the publication 120 is open at page 122 and/or page 126. In other embodiments, transmitter 124 transmits different data in its two modes so that the portable monitor or other data collector can determine whether the publication 120 has been opened at pages 122 and 126.

In certain embodiments, a motion detector, such as an accelerometer, is included in or on the publication to detect motion of the publication. The motion detector is coupled with the transmitter 124 to provide an enabling signal thereto when sufficient motion of the publication is detected to indicate that it may be in use. Upon receipt of such enabling signal, transmitter 124 is enabled to transmit.

In certain embodiments, wireless transmitter 124 comprises an RFID tag having an antenna circuit wirelessly coupled with the device 128 when pages 122 and 126 are closed on one another. In various ones of such embodiments the device 128 comprises a circuit coupled with the antenna circuit of transmitter 124 to detune it when in close proximity. In other such embodiments, device 128 acts as an RF shield to attenuate RF energy received by or transmitted from the transmitter 124. Device 128 in various embodiments is formed by printing or placing one or more layers of conductive inks, foils or other conductive materials on the page 126. These techniques enable various circuit components, such as inductors and capacitors, to be produced on the publication by depositing one or more layers of conductive materials with insulating layers, as appropriate.

Figure 5A:
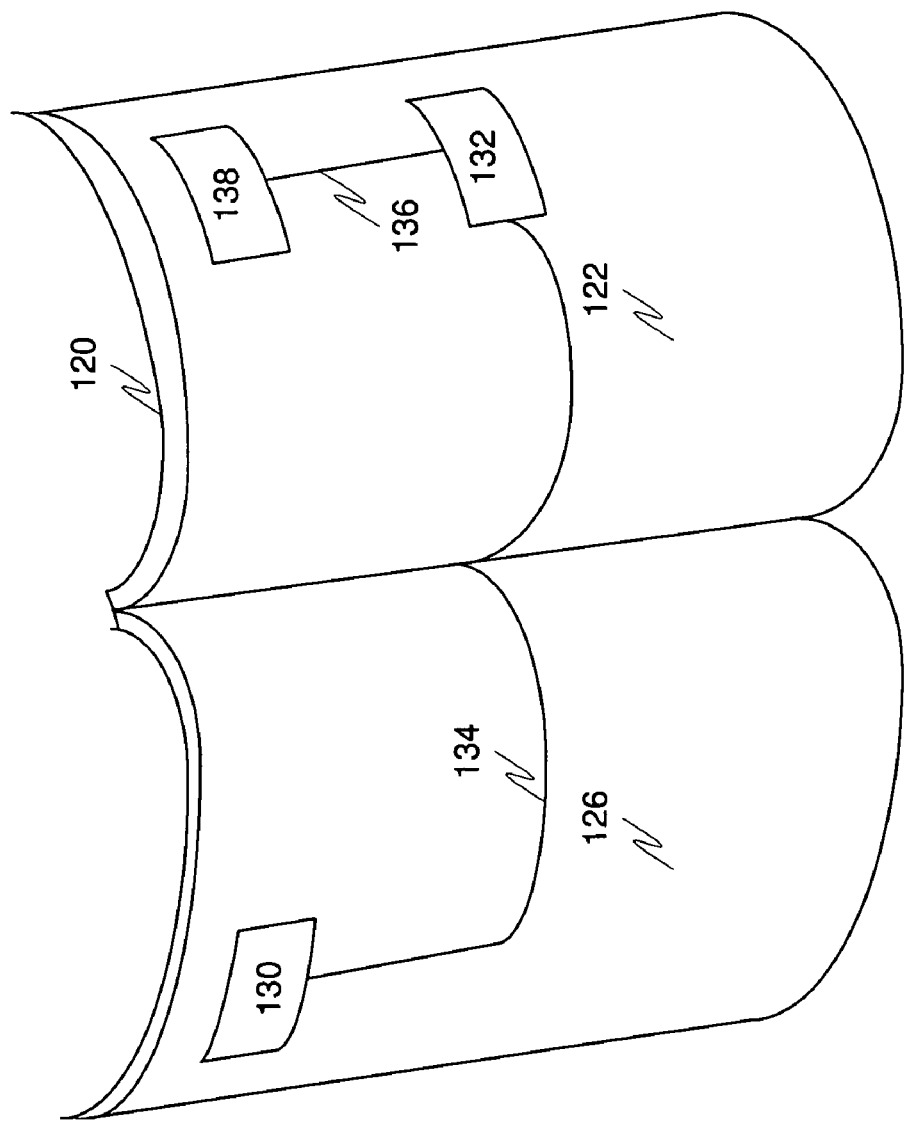
FIG. 5A is yet another schematic illustration of a publication.

FIG. 5A schematically illustrates a variant of the embodiment of FIG. 5, wherein corresponding elements have the same reference numerals. In the embodiment of FIG. 5A a wireless transmitter 132 is coupled with a first device 130 on page 126 via lead 134 and with a second device 138 on page 122 via lead 136. Devices 130 and 138 are positioned on their respective pages so that when pages 122 and 126 are closed on one another, devices 130 and 138 are coupled with one another wirelessly to establish a first state of transmitter 132, while when pages 126 and 122 are opened sufficiently, devices 130 and 138 become decoupled to establish a second state of transmitter 132. The two states of transmitter 132 are used in the same manner as in the embodiment of FIG. 5 to determine whether the publication 120 has been opened at pages 122 and 126.

In certain embodiments, devices 130 and 138 are conductive patterns establishing a capacitive coupling when pages 122 and 126 are closed. In certain embodiments, devices 130 and 138 form respective inductors inductively coupled with one another when pages 122 and 126 are closed.

An apparatus for use in gathering data concerning exposure of a participant in a publication readership study to at least one page of a predetermined publication comprises a wireless transmitter in or on the publication; and a device positioned in or on the publication, the device interacting wirelessly with the wireless transmitter such that when two predetermined pages are closed, a first state of the wireless transmitter is established, and when the two predetermined pages are opened, a second state of the wireless transmitter is established. In certain embodiments, the apparatus comprises a portable monitor carried on the person of the participant for detecting the second state of the wireless transmitter. In certain embodiments, the portable monitor is activated by the second operational state of the wireless transmitter. In certain embodiments, the device comprises at least one of an electromagnetic deflector, an interference circuit, an attenuation circuit, and a detuning circuit. In certain embodiments, the apparatus comprises a motion detector in communication with the wireless transmitter, the motion detector being operative to produce signals to further control the state of the wireless transmitter.

A method for detecting exposure of a publication to a person comprises including a wireless transmitter with the publication; and providing a control device in or on the publication and positioned to interact wirelessly with the wireless transmitter, the control device being operative to change a state of the wireless transmitter in response to exposure of the publication to a person. In certain embodiments, the method comprises receiving data in a portable monitor carried on the person of a participant in a publication usage study in response to the change in state of the wireless transmitter.

Figure 6:
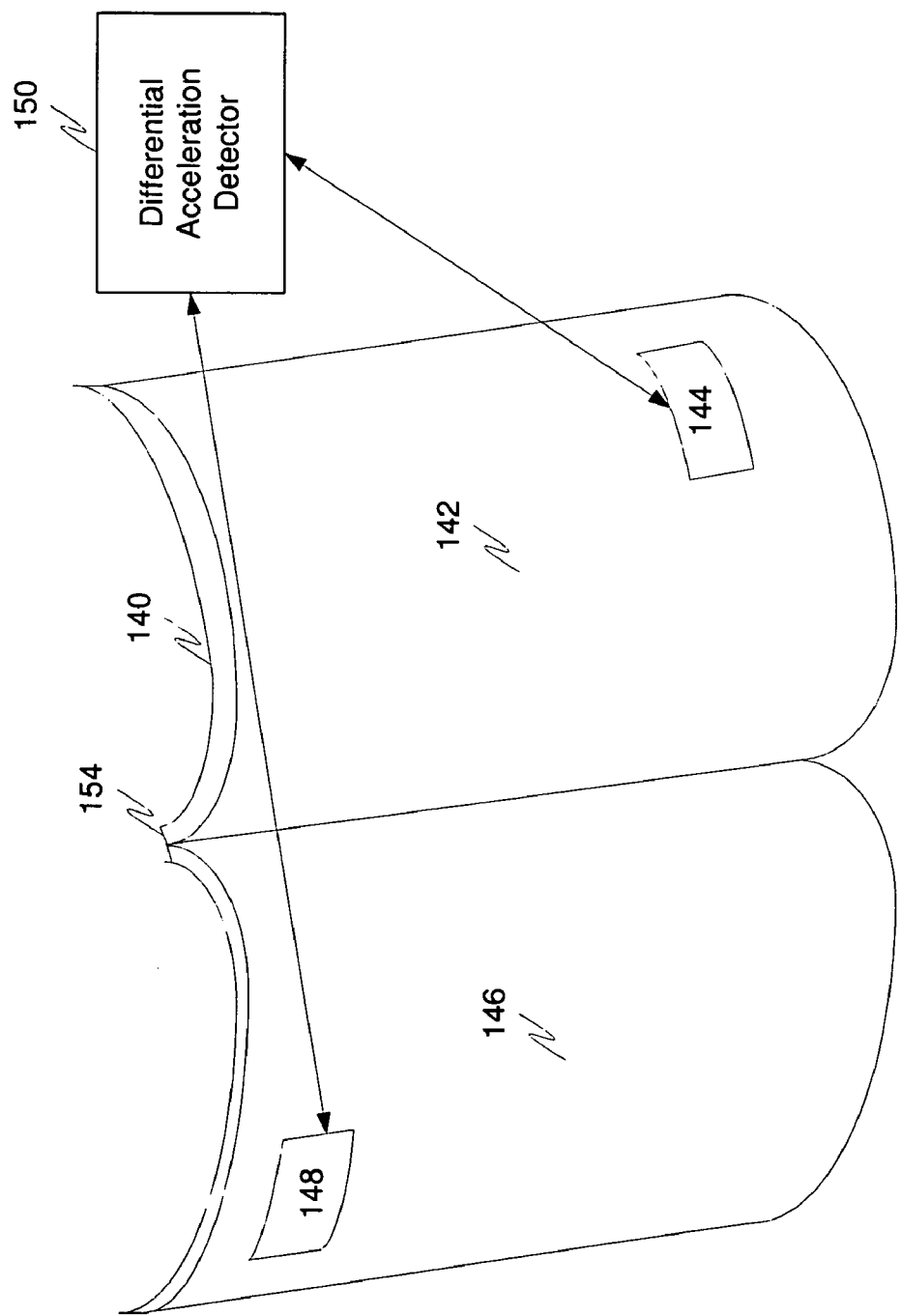
FIG. 6 is a schematic illustration of a publication having acceleration detectors.

FIG. 6 schematically illustrates a publication 140 open at first and second pages 142 and 146. A first acceleration detector 144 is positioned in or on page 142, while a second acceleration detector is positioned in or on second page 146. A differential acceleration detector 150 is coupled with each of acceleration detectors 144 and 148 to detect a difference between their output signals in order to determine that the pages have been moved relative to one another, indicating that pages 142 and 146 have either been opened or closed by the reader. In certain embodiments, the differential acceleration detector 150 is positioned in or on the publication 140, and either incorporates a wireless transmitter to communicate detected data to a portable monitor or other data collector or is coupled with a separate wireless transmitter for this purpose. In other embodiments, the differential acceleration detector is incorporated in the portable monitor or other data collector, and the outputs of detectors 144 and 148 are wirelessly transmitted thereto by one or more wireless transmitters in or on publication 140.

In certain embodiments, both acceleration detectors 144 and 148 are positioned on the same page but at differing distances from a binding 154 of the publication 140. In certain embodiments, one of the acceleration detectors is positioned in or one the binding 154 or in or on a cover of the publication 140.

A system for producing data indicating that a page of a publication has been turned comprises a first acceleration detector positioned at a first location in or on the predetermined page; a second acceleration detector positioned at a second location in or on the publication, the second location differing from the first location; and a differential acceleration detector coupled with the first and second acceleration detectors and operative to produce page turn indication data. In certain embodiments, the apparatus comprises a portable monitor carried on the person of a participant in communication with the differential acceleration detector to receive the page turn indication data or data based thereon.

Figure 7:
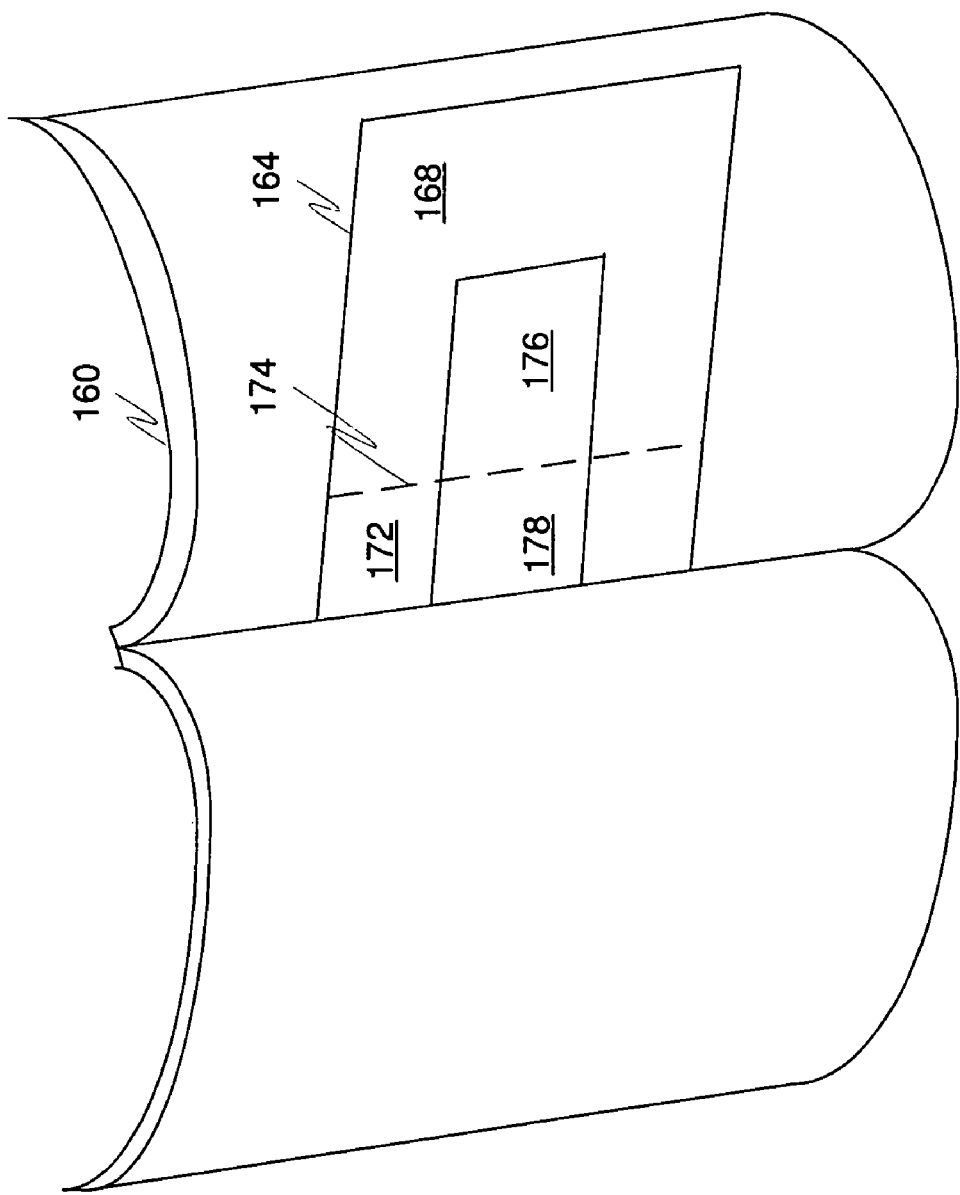
FIG. 7 is a schematic illustration of a publication having a detachable card insert.

FIG. 7 schematically illustrates a publication 160 having a card insert 164 affixed between two pages of the publication 160 and having a first portion 168 detachably affixed to a second portion 172 permanently affixed to the publication. First portion 168 of card insert 164 may be detached from second portion 172 along a perforated or otherwise weakened portion 174 by a publication user and used to submit an inquiry by mail or other physical delivery regarding a product or service, or to otherwise provide or request information from another.

A wireless transmitter 176 is disposed in or on the removable first portion 168 and is coupled with a device 178 in or on the second portion 172 so long as the first and second portions remain attached. Once the reader detaches the first portion 168 from the second portion 172, the device 178 is uncoupled from the wireless transmitter 176. The wireless transmitter 176 has a first state which is maintained so long as the first and second portions are attached and device 178 is thus coupled with wireless transmitter 176, and a second state established upon separation of the first and second portions and the consequent uncoupling of device 178 from wireless transmitter 176. In certain embodiments, transmitter 176 is maintained in an inactive mode when in its first state, but switches to an active mode when in its second state. In such embodiments, a portable monitor or other data collector receives a transmission from transmitter 176 as an indication that the first portion 168 has been removed from the publication 160. In certain other embodiments, transmitter 176 transmits in its first state and ceases transmitting when it switches to its second state. In certain embodiments, transmitter 176 transmits different data in its two states so that the portable monitor or other data collector can determine whether the first portion 168 has been removed from the publication 160

In certain embodiments, device 178 is conductively coupled with transmitter 176, such that upon separation of portions 168 and 172 this connection is broken. In certain ones of such embodiments, device 178 is a jumper maintaining a connection between two points in a control circuit of transmitter 176. In certain ones of such embodiments, device 178 constitutes a control circuit.

In certain embodiments, the wireless transmitter 176 is positioned in or on portion 172, while the device 178 is positioned in or on portion 168.

An apparatus for producing data indicating use of a publication by a person comprises a card removably affixed to a publication, a wireless transmitter in or on one of the card and the publication and a device in or on the other of the card and the publication, the wireless transmitter being coupled with the device while the card is affixed to the publication and uncoupled therefrom upon removal of the card from the publication, the wireless transmitter having a first state when coupled with the device and a second state when uncoupled therefrom. In various embodiments, the device comprises one or more of a jumper, an electromagnetic deflector, a destructive interference circuit, an attenuation circuit and a detuning circuit.

A method for monitoring use of a publication by a person comprises detecting predetermined translational movement of the publication; and producing usage data indicating use of the publication by a person in response to detecting the predetermined translational movement. An apparatus for producing data indicating use of a publication by a person comprises a motion detector in or on the publication and a wireless transmitter, the motion detector being operative to produce a motion signal indicating motion of the publication and coupled with the wireless transmitter to provide the motion signal thereto, the wireless transmitter being operative to transmit data indicating motion of the publication based on the motion signal. In certain embodiments, the motion detector is an accelerometer. In certain embodiments, the wireless transmitter transmits its data to a portable monitor carried on the person of a participant in a publication usage study.

Figure 8:
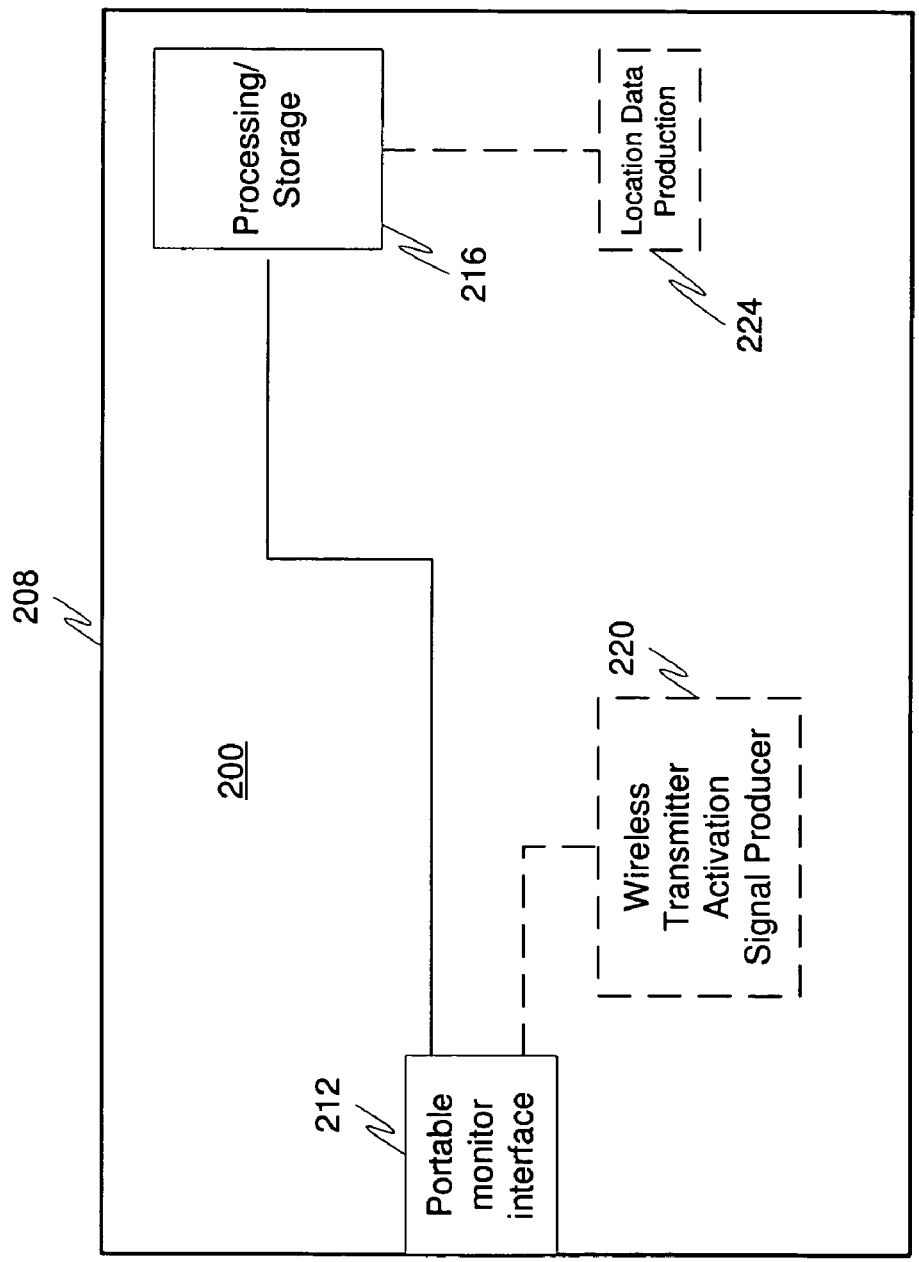
FIG. 8 is a functional block diagram of a portable monitor.

FIG. 8 schematically illustrates a portable monitor 200 useful in certain ones of the embodiments of portable monitor 24 of FIGS. 1A, 1B and 1C, and having an enclosure 208 having a size and shape selected so that portable monitor 200 may be carried on the person of a participant in a publication usage study. Portable monitor 200 comprises a portable monitor interface 212 for communicating data to and from the monitor 200. The interface 212 includes a wireless receiver (not shown for purposes of simplicity and clarity) operative to receive wireless transmissions from wireless transmitters in or on publications, such as one or more of transmitters 28, 58, 84, 124, 132 and 176. In certain embodiments, the portable monitor interface 212 includes further wireless receivers for use in detecting presence of the participant carrying the monitor 24 in a commercial establishment and/or to monitor exposure of the participant to products. In certain embodiments, the same wireless receivers in interface 212 are used to monitor usage of publications and presence of the participant in a commercial establishment and/or are used to monitor usage of publications and exposure of the participant to products. The portable monitor 200 stores the received data or data based thereon at 216 for later downloading via interface 212 to a centralized processor (not shown for purposes of simplicity and clarity), or communicates such data without prior storage, for producing reports concerning usage of publications.

In certain embodiments, monitor 200 includes circuitry 220 which produces an activation signal which is wirelessly transmitted by the interface 212 to one or more wireless transceivers in a publication to activate them to transmit data. In certain embodiments, the monitor 200 includes circuitry 224 for producing location data indicating a location of the participant carrying the portable monitor 200. Such location data is produced in various embodiments by means of a GPS receiver, an assisted GPS receiver, an inertial monitoring unit or a wireless location signal receiver which receives short range location signals containing data indicating locations of their respective transmitters. The portable monitor 200 receives the location data at 216 for use in confirming publication usage data received by the interface 212. For example, if the location data indicates that the participant is walking or running along a sidewalk, a road or within a park, such location data implies that the participant is probably not reading a publication whose data is then received by the monitor 200. However, if the location data indicates that the participant is home or on a train, this location data implies that the participant may well be reading a publication, and thus tends to confirm the validity of publication usage data received by the monitor 200 at that time.

A method of gathering and confirming data concerning usage of a publication by a participant in a publication usage study comprises gathering publication usage data indicating use of a publication by the participant; gathering participant location data indicating a location of the participant; and confirming the publication usage data based on the participant location data.

An apparatus for facilitating the collection of data in a publication readership study comprises a wireless transmitter in or on the publication; and a portable monitor carried on the person of a participant in a publication readership study that wirelessly activates the wireless transmitter to communicate data about the publication to the portable monitor. In certain embodiments, the apparatus comprises a power source coupled to the wireless transmitter for energizing the wireless transmitter when the wireless transmitter is activated by the portable monitor.

A method for monitoring use of publication by a person comprises at least two of detecting translational movement of the publication; detecting grasping of the publication; detecting deformation of the publication; detecting proximity of a person to the publication; and detecting exposure of the publication. In certain embodiments, the method comprises detecting the at least two of translational movement, grasping, deformation, proximity of a person, and exposure within a predetermined interval.

Figure 9:
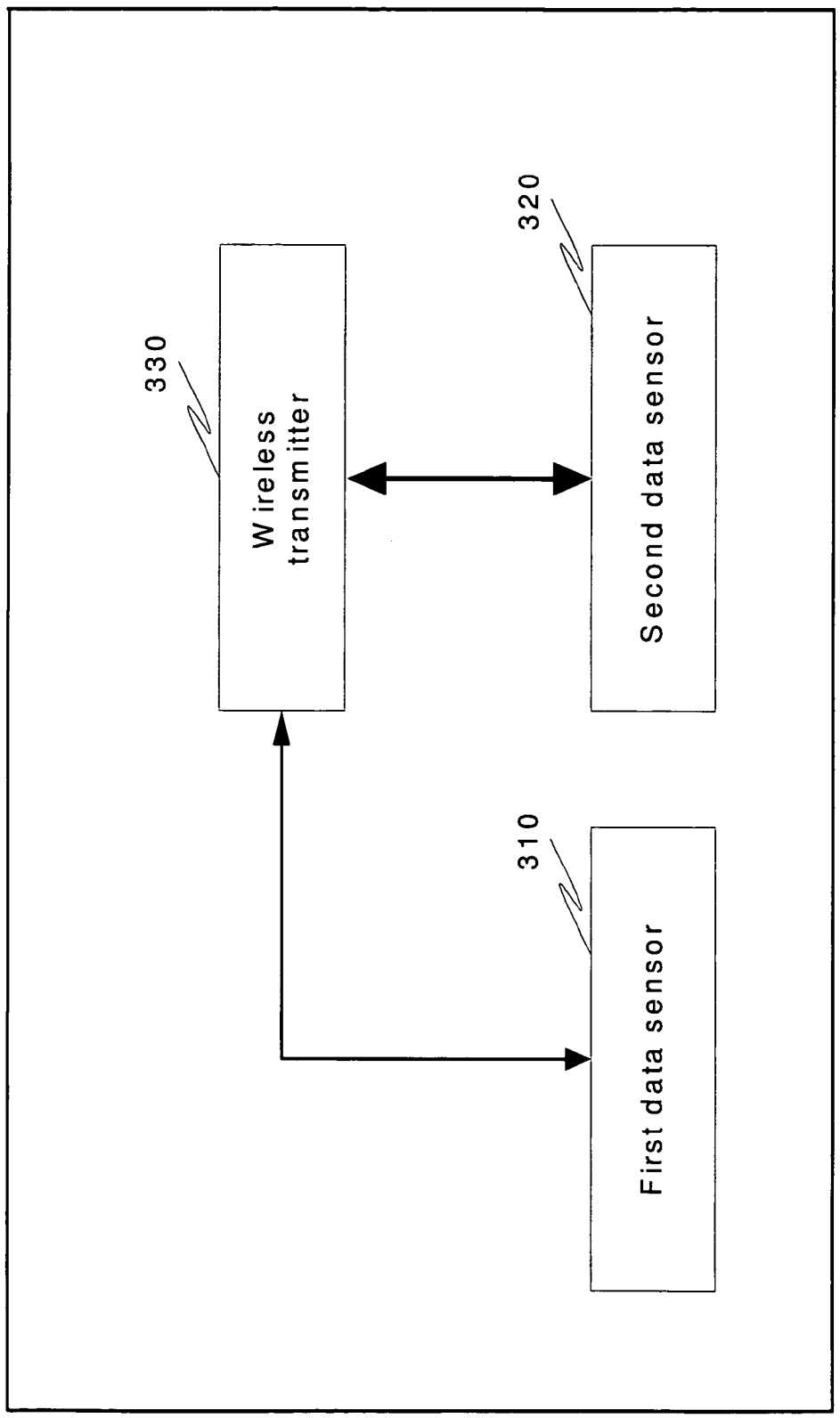
FIG. 9 is a functional block diagram showing data sensors and a wireless transmitter used with a publication.

FIG. 9 schematically illustrates a publication 300 having a first data sensor 310 and a second data sensor 320 therein or thereon. First sensor 310 senses a selected one of translational movement, deformation, grasping, proximity of the publication to a person and exposure of the publication. Second data sensor 320 senses one of translational movement, deformation, grasping, proximity of the publication to a person and exposure of the publication, other than the event or condition sensed by the first data sensor 310. The first and second data sensors are coupled with a wireless transmitter 330 to communicate the data sensed by the first and second data sensors to a portable monitor or other data collection system. In certain embodiments, transmitter 330 processes the received data, for example, to reduce noise or else to detect components therein indicating an event or condition being sensed. The transmitter 330 either wirelessly transmits the processed signal to a monitor or other data collector, or transmits the signal received from the transducer substantially unchanged.

An apparatus for facilitating the collection of data in a publication readership study comprises a first detector in or on the publication and operative to detect a selected one of translational movement, deformation, grasping, proximity to a person, and exposure; and a second detector in or on the publication and operative to detect one of translational movement, deformation, grasping, proximity to a person, and exposure of the publication other than the selected one thereof.

Figure 10:
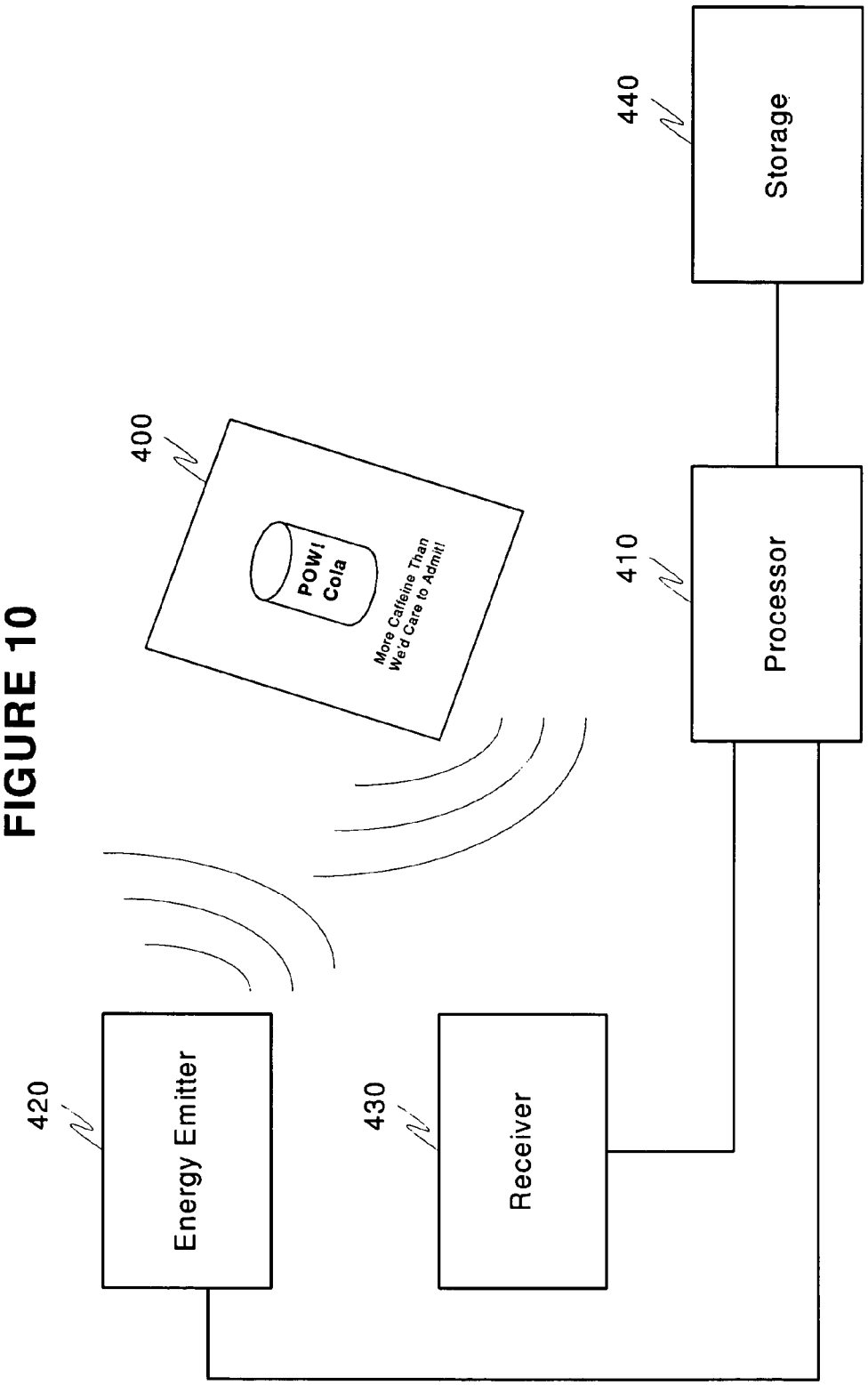
FIG. 10 is a schematic illustration of systems used to produce a signature.

FIG. 10 schematically illustrates a system for producing a signature representing a publication or a portion 400 thereof. The signature serves to identify the publication or its portion, such as an advertisement in a publication. In FIG. 10, portion 400 comprises an advertisement for a fictional product, POW! Cola. In certain embodiments the publication or a portion thereof is printed in conductive ink and an energy emitter 420 of the system of FIG. 10 emits RF or other electromagnetic energy toward the publication 400, under the control of a processor 410. The conductive image on the publication 400 reacts to the received energy to reflect portions thereof and/or store, modify and retransmit portions thereof to a receiver 430. Receiver 430 provides its received data, including data representing energy received from the publication 400, to processor 410 which analyzes such data to extract portions thereof based on frequency, amplitude, phase or other signal characteristics and produce a set of data therefrom which characterizes the publication or portion thereof that was exposed to the electromagnetic energy. This set of data is stored in storage 440 along with associated data identifying the publication or portion thereof or otherwise characterizing one or the other.

Figure 11:
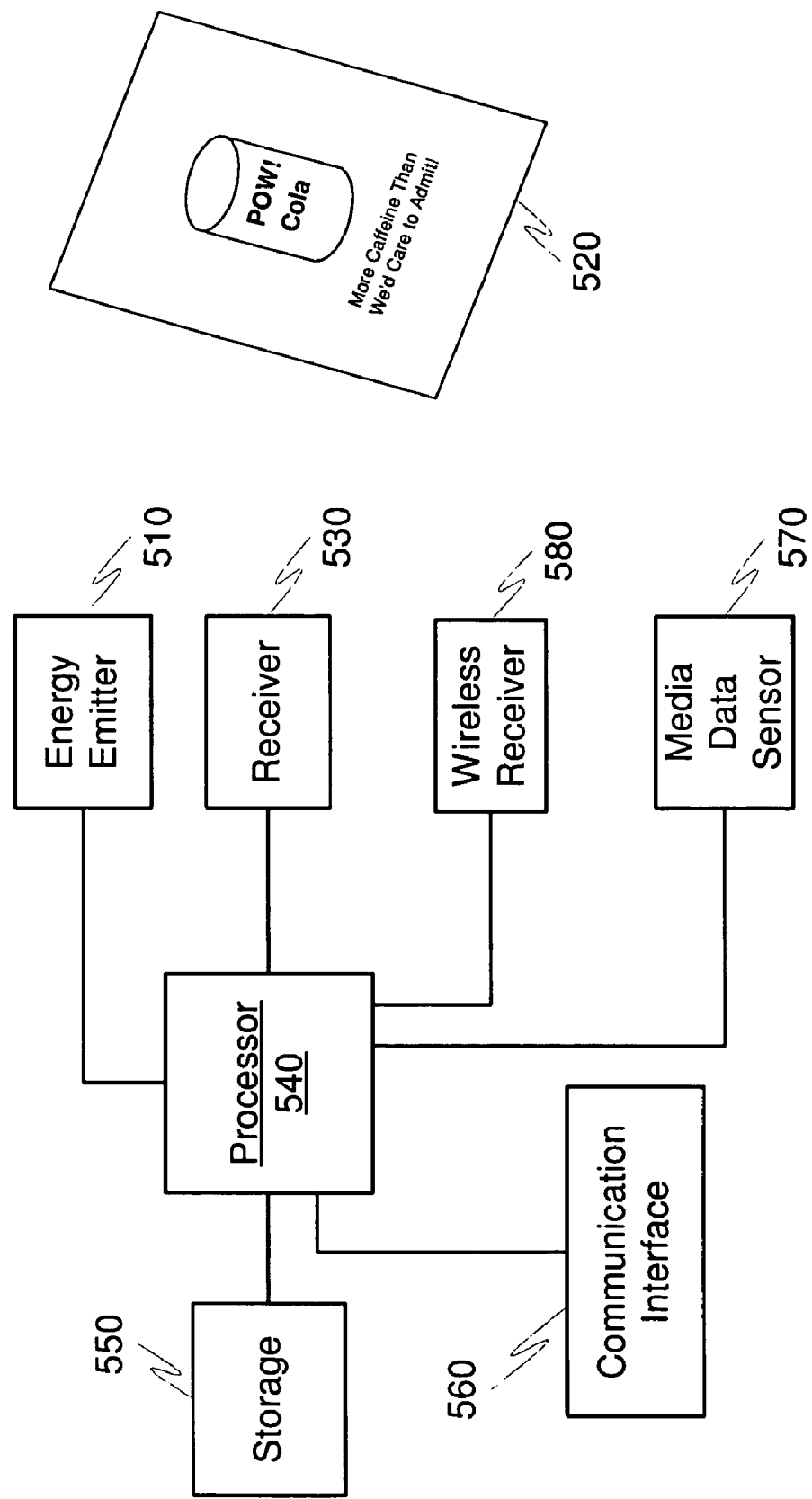
FIG. 11 is another schematic illustration of systems.

In this manner, a library of signatures identifying or characterizing publications or portions thereof, such as advertisements, is created. With reference to FIG. 11, in conducting a publication usage study, participants are provided with portable monitors, such as monitor 500 shown schematically in block diagram format according to certain embodiments of the portable monitor 24 of FIGS. 1A, 1B and 1C. Monitor 500 includes an energy emitter 510 which emits energy of the same kind as the system of FIG. 10 in order to cause a publication or portion thereof 520 to reflect or transmit energy to a receiver 530 in the monitor 500. A processor 540 in monitor 500 extracts a signature in the same manner as processor 410 of FIG. 10 and either stores the same for later processing in storage 550, or else attempts to match it with a reference signature in the library of reference signatures representing publications and portions of publications developed by the system of FIG. 10 and stored in storage 550. When such a match occurs, it is determined that the participant carrying the portable monitor which gathered the signature, was exposed to the publication or portion thereof. When such a match occurs, the data associated with the reference signature is stored in storage 550 with or without an indication of the participant for producing reports concerning usage thereof. A communication interface 560 is provided in monitor 500 to either communicate signatures gathered by monitor 500 to a centralized processor for matching with reference signatures, or else to communicate match data for use in producing reports on publication usage.

A method for detecting exposure of a participant in a publication readership study to a predetermined publication comprises exposing the predetermined publication to a first energy signal to induce the predetermined publication to produce a first responsive signal containing reference data concerning the predetermined publication; receiving the first responsive signal and extracting the reference data therefrom; storing the reference data in a reference database in association with data relating to the publication; at a time corresponding to an exposure of the participant to the predetermined publication, exposing the predetermined publication to a second energy signal to induce the predetermined publication to produce a second responsive signal containing signature data concerning the predetermined publication; receiving the second responsive signal and extracting the signature data therefrom; and matching the signature data with the reference data to detect exposure of the participant to the predetermined publication. In certain embodiments, the publication comprises image data visible to the participant, and the method comprises exposing the image data to the first energy signal to induce the image data to produce the first responsive signal and exposing the image data to the second energy signal to induce the image data to produce the second responsive signal.

With reference again to FIG. 11, the monitor 500 also includes a media data sensor 570 which serves to collect data concerning exposure of the participant to media data. In certain embodiments, the media data sensor 570 comprises a microphone to pick up audio media data which it supplies to the processor 540 for producing data concerning exposure of the participant to audio media data and associated other data, such as video data. In certain embodiments, the sensor 570 comprises a light detector to pick up remote control signals indicating selection of a channel or other source of media data. In certain embodiments, sensor 570 is an RF receiver that picks up RF energy indicating media data selected for exposure to the participant. In each case, processor 540 produces media data exposure data which it stores in storage 550 to provide records of media data to which the participant was exposed. Preferably, both the publication usage data and media data exposure data are stored along with a time stamp indicating times of usage or exposure, as appropriate. The time stamp is obtained from a single clock (not shown for purposes of simplicity and clarity) so that the time stamps are all provided on the same time base.

In certain embodiments, the portable monitor 500 includes one or more wireless receivers 580 for use in detecting the presence of the participant carrying the monitor 500 in a commercial establishment and/or to monitor exposure of the participant to products. In certain embodiments the sensor 570 is used to detect the presence of the participant in a commercial establishment and/or to monitor exposure of the participant to products.

A system for gathering data concerning exposure of an individual to media data and usage of a publication thereby comprises a portable monitor capable of being carried on the person of the individual, the portable monitor comprising a media data exposure monitor and a publication usage monitor.

A method of gathering data concerning exposure of an individual to media data and usage of a publication thereby comprises gathering data concerning exposure of the individual to a product with the use of a portable monitor carried on the person of the individual, and gathering data concerning usage of a publication by the individual with the use of the portable monitor.

Monitoring Presence in a Commercial Establishment

The monitor 24 of FIGS. 1A, 1B and 1C is useful for monitoring the presence and/or movements of customers in all manner of commercial establishments, but is particularly useful for gathering such data in retail stores for carrying out traffic flow studies and/or exposure to advertising and promotional activities. FIG. 1B schematically illustrates a floor of a retail store 10 having an entrance 20 and a plurality of fixtures 25 comprising shelving for products offered for sale. The fixtures 25 define aisles 28 therebetween.

The portable monitor 24 is carried on the person of a panelist participating in a market research study to track the presence and movements of the panelist into and within the retail store, as well as other such retail stores and/or other commercial establishments participating in the study. As depicted in FIG. 1B, when the panelist enters the retail store at the entrance 20, the portable monitor 24 carried by the panelist receives a location signal from a radio frequency (RF) transmitter 36 positioned in proximity to the entrance 20. The frequency or frequencies of the location signal can be selected from any permissible frequency range, up to and including microwave frequencies.

The location signal contains data from which the presence of the panelist at the entrance can be determined. Such data in certain embodiments comprises a transmitter identification code that uniquely identifies the transmitter 36. In certain embodiments a commercial establishment identification code is transmitted by the transmitter, along with the transmitter identification code. This transmitter identification code, and commercial establishment identification code, if any, are stored in a database where this data is associated with data identifying the location of the transmitter at the entrance to the retail store. In other embodiments, the location signal contains data that either directly or indirectly identifies the location. In still other embodiments, as described hereinbelow, a commercial establishment identification code is supplied to the monitor 24 for storage therein from another source, such as a separate wireless transmitter.

The strength of the transmitted location signal, along with the sensitivity of the monitor 24 are selected to ensure that monitor 24 will only detect the data contained in the location signal when it is sufficiently near the identified location for the purposes of the study. In certain advantageous embodiments, one or both of the strength of the location signal and the sensitivity of the monitor are selected to ensure that the monitor 24 will only detect the data in the location signal when the monitor is located within a predetermined area to be monitored, such as a predetermined area in which a particular product or product display can be perceived by the panelist. When the monitor 24 detects the data contained in the location signal, it stores either the data or data based thereon, together with a time stamp indicating the time at which the data was received.

With reference also to FIG. 1C, after the panelist has entered the store and then proceeds down an aisle flanked by shelves 38 holding various products offered for sale, the panelist comes into the range of a transmitter 40. The portable monitor 24 carried by the panelist then detects the data contained in a further location signal from the transmitter 40, and stores it along with a time stamp indicating the time of detection of the further location signal. With reference particularly to FIG. 1C, it will be seen that the transmitter 40 has been placed in the vicinity of a particular product offered for sale, here indicated as a fictitious product, Champs Chomp dog food. If the panelist lingers in the vicinity of transmitter 40, this indicates that the panelist may be interested in purchasing the adjacent product.

Accordingly, periodically or from time to time the monitor 24 checks for the detection of the data contained in the same or a different location signal. If the data of the further location signal has again been detected, the monitor 24 stores further data indicating a duration of the continuous presence of the panelist in the vicinity of transmitter 40.

FIG. 12 illustrates an embodiment of a table storing the location data and commercial establishment identification data detected by the monitor 24 from various location signals, together with time stamps indicating a time of detection of the data and the duration of continuous detection of the same data. In the exemplary table of FIG. 12, each row represents a record of the detection of the data from a respective transmitter, here represented as a transmitter ID, along with a monitor ID (which corresponds to the panelist to whom the particular monitor has been assigned), the time at which the data from that transmitter was first detected and a duration of continuous detection of the data from such transmitter. In certain other embodiments the data detected by the monitor is stored without the monitor ID which is not associated with the other stored data until it has been downloaded from the monitor 24.

A first record 644 of the FIG. 12 table is an example of the data stored by portable monitor 24 upon detection of the data contained in a location signal received from transmitter 36 when the panelist enters the retail store through entrance 20. In the embodiment of FIG. 12, each transmitter transmits a signal containing location data as well as commercial establishment data (here indicated as a fictitious retail store, Ed's Emporium). In other embodiments, separate transmitters transmit commercial establishment data. In certain embodiments, the commercial establishment data directly identifies the commercial establishment, while in others the commercial establishment data is used to access or derive such identity. In certain embodiments, the commercial establishment data relates to the commercial establishment, with or without identifying it directly or indirectly. In certain embodiments, the identity of the commercial establishment in which a location signal transmitter is located is determined based solely on previously stored data associating a transmitter ID with the store or other establishment in which it is located. Returning to record 644 of FIG. 12, the recorded duration of this detection is indicated to be less than 5 seconds. A second record 648 stores data detected by monitor 24 in the vicinity of transmitter 40. Here the record indicates that the panelist remained for 20 seconds indicating interest in Champs Chomp dog food in Ed's Emporium.

Figure 13:
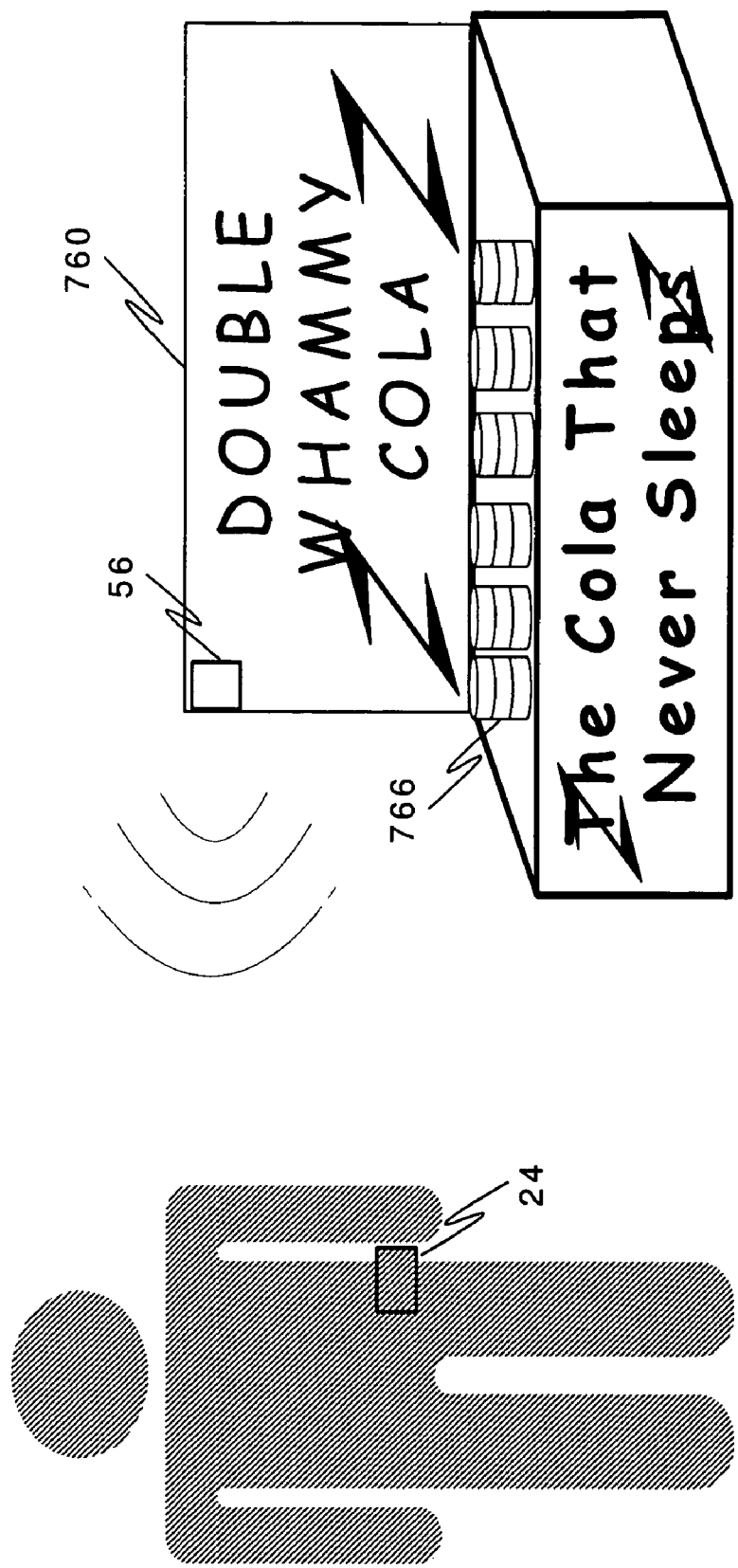
FIG. 13 illustrates a method and system for measuring exposure of a panelist participating in a consumer behavior study to a promotional display.

A further record 652 of the FIG. 12 table represents data gathered by the monitor as the panelist pauses in the vicinity of a transmitter 56 shown in FIG. 1B near the end of a store fixture 24. FIG. 13 illustrates the transmitter 56 mounted on an in-store product display 760 for a fictitious soft drink product, Double Whammy cola. As shown in FIG. 13, the product display 760 serves to attract attention to the product 766 which it carries or contains. As the panelist stops by the product display 760, the monitor records data indicating the duration of the panelist's presence near the product display providing an indication of its effectiveness in attracting consumer attention.

With reference again to FIG. 1B, as the panelist proceeds down another aisle, the monitor 24 detects data contained in a location signal from a transmitter 70 placed above the aisle to estimate the amount of traffic therethrough to detect whether the aisle is a "cold spot" in the store. The detected data is stored by the monitor 24 in a record such as exemplary record 674 shown in FIG. 12.

Still later the panelist pauses in the vicinity of another transmitter 78 to examine a product, as indicated by record 682 in FIG. 12. Shortly thereafter, the panelist proceeds to the stores' checkout counter (not shown for purposes of simplicity and clarity) to pay for the selected products, and then leaves the store as indicated by record 686 in FIG. 12.

FIG. 14 provides a block diagram of certain embodiments of the portable monitor 24, along with a block diagram 886 of certain embodiments of the transmitters 36, 40, 56, 70 and 78. In the diagram 886, an RF transmitter 890, antenna 894, code modulator 898, proximity detector 802, power switch 806 and power source 810 are enclosed or carried within a container 804. The container 804 preferably is small and otherwise inconspicuous, so that it is unnoticed by panelists and thus does not influence their behavior. In certain embodiments, the transmitters are contained in a thin laminated package that can be affixed inconspicuously to the bottom of a store shelf. In others they are carried in a small housing or encapsulated in molded plastic.

In the transmitter embodiment 886, power from the power source 810 is only applied to the RF transmitter 890 and code modulator 898 when the proximity detector 802 detects the presence of a person in proximity to the transmitter 886 and turns on the normally off power switch 806. The proximity detector 802 senses a selected form or forms of data indicating the presence or approach of a person, such as changes or levels of infrared, thermal, light, or electrical energy, and then provides a switching signal to power switch 806 to turn it on. In certain embodiments an external switch is employed to switch on power, such as a pressure sensitive switch activated by the panelist's footstep or a doorway switch actuated by opening a door or passing through a doorway. Preferably power switch 806 remains on only long enough to ensure that a detectable location signal is transmitted to any monitor 24 that may be carried by a panelist nearby, so that power from the source 810 is conserved to ensure the continuing ability of the transmitter 886 to function. As an example only, in certain embodiments the power switch applies power continuously for 30 seconds after receipt of the switching signal and then automatically resets to an off state, so that the location signal is transmitted continuously for such 30 second period. In certain embodiments, the transmitter has two operational states, a standby, low power mode in which it does not transmit and a transmit mode in which it does. In such embodiments, the switch 806 or other circuitry switches the transmitter from the standby mode to the transmit mode when a person's proximity is detected.

The RF transmitter 890 drives antenna 894 to transmit an RF location signal within an appropriate band selected as any permissible RF band up to and including microwave frequencies. In certain embodiments the RF transmitter 890 produces the location signal in an unlicensed 900 MHz band and at a sufficiently low power level so that its data will be detectable by monitor 24 only within a relatively short range.

The data contained by the location signal is produced by code modulator 898 and applied as a modulating signal by code modulator 98 to RF transmitter 890. In certain embodiments, the data represents an identification of the transmitter itself, while in others it directly represents the location of the transmitter 886 or store or other commercial establishment. The location signal can be modulated in any manner that is compatible with the detection capabilities of portable monitor 24, such as by amplitude, frequency, pulse or phase modulation or any combination thereof. In certain embodiments the data is simply represented by the frequency of the location signal, so that a separate code modulator is not required. In certain embodiments, the data modulates the location signal to produce a periodically repeating code. As an example, such a code could repeat every 10 seconds during the transmission of the location signal, although a different repetition rate could be selected depending on the amount of data that must be transmitted and the detection error rate of the personal monitor 24 within the desired detection area.

The power source 810 is selected as one that is capable of supplying sufficient power for a desired duration, such as the duration of the marketing study. The power source 810 in certain embodiments is selected as a rechargeable battery, a non-rechargeable battery, an energy storage device, a photoelectric power source and/or a different energy receiving device such as an antenna receiving energy from the portable monitor 24 or other external source.

In certain embodiments rather than transmit upon detection of a person in proximity to the transmitter 886, the RF transmitter 890 transmits the location signal periodically. In still other embodiments the RF transmitter 890 transmits the location signal in response to a query signal transmitted from a transmitter included in the portable monitor 24 (not shown for purposes of simplicity and clarity). In certain embodiments, the transmitter is an RFID tag that receives a read signal from the monitor 24, and uses the energy of the received read signal to encode its data and retransmit the encoded data as a location signal. In embodiments which employ such RFID tags, it is advantageous to selectively key the monitor on to transmit such read signal as infrequently as possible, due to the relatively large amount of energy that must be transmitted by the monitor 24 to energize the RFID tag to retransmit a detectable location signal. For this purpose, in certain embodiments a transmitter is provided in or near the commercial establishment to key the monitor to transmit the read signal.

In certain embodiments, one or more RF energy emitters separate from the monitors 32 are placed in or near the store or other commercial establishment to emit RF energy to be received by one or more nearby RFID tags in order to energize them to transmit their codes. When a panelist carrying a monitor 24 comes within range of one of such RFID tags, the monitor detects its code and stores appropriate data. In certain embodiments, the RF energy emitters emit RF energy continuously. In others, the RF energy emitters emit RF energy periodically, from time to time, at certain times or during certain time periods. In still other embodiments, the RF energy emitters emit RF energy upon detecting either a presence of a person or of a monitor 24.

In other embodiments in place of an RF transmitter 890, the transmitter 886 employs a different type of wireless transmitter, such as an infrared, visible light or acoustic transmitter. An appropriate acoustic location code emitter for this purpose is disclosed in U.S. published patent application 20030171833 A1 in the names of Jack C. Crystal and James M. Jensen, assigned to the assignee of the present application and hereby incorporated in its entirety herein by reference.

FIG. 14 also provides a block diagram of an embodiment of the portable monitor 24 which includes an RF receiver 814, an antenna 818, a microphone 822, conditioning circuitry 826, a processor 830, a memory 834, a coupling device 836, an enclosure 838 and a wireless receiver 839 containing all of the foregoing elements of portable monitor 24. The enclosure preferably is sufficiently small to permit the portable monitor 24 to be carried in or on an article of clothing worn by the panelist, such as a belt, pocket, collar or lapel, or on the panelist's wrist or elsewhere. In certain embodiments the enclosure 838 is provided with a clip, loop, necklace, band, pin or other device (not shown for purposes of simplicity and clarity) to affix or hang the monitor 24 to or from such an article of clothing or to the panelist's wrist, neck or elsewhere. In certain embodiments, the enclosure 838 has a size and shape similar to a pager, or cellular telephone. In certain embodiments, enclosure 838 has a size and shape similar to a credit card or smart card, so that it can be carried in a panelist's pocket or wallet or attached to a keychain. In still other or related embodiments, the enclosure 838 takes the form of a wristwatch, wristlet, card case, key fob, change purse, article of jewelry or other decorative or useful article, or else is adapted to be carried by or attached to one or more of the foregoing.

RF receiver 814 has an input coupled with antenna 818 to receive the location signal and is operative to detect the data therein and supply it at an output coupled with processor 830 in a form suitable for input to the processor 830. Preferably, the receiver 814 is operated only periodically, or from time to time, in order to conserve power in the portable monitor 24. For example, in certain embodiments the receiver 844 is turned on for a 10 second period during a repeating 30 second interval.

Where the transmitter 886 transmits the location signal in a different form, such as infrared or visible light, wireless receiver 814 and antenna 818 are replaced in other embodiments of the portable monitor 24 by a suitable light sensor and conditioning circuitry coupled with the light sensor and operative to detect the data contained in the location signal and supply it in a suitable form to the processor 830. Where the transmitter 86 instead transmits an acoustic location signal, in certain embodiments of portable monitor 24 the microphone 822 and conditioning circuitry 826 serve to receive the location signal and supply it in suitable form to the processor 830. In certain ones of such embodiments the processor 830 serves to detect the data contained in the location signal transmitted in acoustic form.

The processor 830 is also operative to store the detected location data with a time stamp produced by processor 830 or else by a separate clock (not shown for purposes of simplicity and clarity). Where the processor continues to receive the same location code, in certain embodiments it produces duration data indicating a duration of continuous receipt of the same location data and stores it in association with the location data and time stamp. In certain other embodiments, in place of duration data, the processor instead stores an ending time stamp representing a point in time when it no longer continues to receive the same location data. In still other embodiments, the processor simply stores each detection of the location data with a respective time stamp associated therewith.

Wireless receiver 839 in certain embodiments is employed to detect the usage of a publication by the participant carrying the monitor 24 and/or to monitor exposure of the participant to products. In certain embodiments, the RF receiver 814 and/or the microphone 822 carry out the functions of wireless receiver 839.

The embodiments of portable monitor 24 illustrated in FIG. 14 also serve to monitor exposure of the panelist to media data having an acoustic component, such as radio and television broadcasts, prerecorded content and streaming media. This is achieved in certain embodiments by processing acoustic data received by microphone 822 in processor 830. Processor 830 analyzes the acoustic data to detect the presence of an ancillary code therein or to extract a signature therefrom, which can be used to identify or otherwise characterize the media data. Suitable analysis techniques are disclosed in published U.S. patent application 20030005430 A1 in the name of Ronald S. Kolessar, assigned to the assignee of the present invention and hereby incorporated herein by reference in its entirety. The monitor 24 stores such media data exposure data in storage 834 together with time stamps representing timing of exposure thereto. Preferably, the time stamp is obtained from the same source as that stored with the data indicating detection of the location data so that the time stamps are all on the same predetermined time base.

In certain embodiments, a commercial establishment signal is transmitted to the monitor 24 by a transmitter other than those employed as in FIG. 1B to represent particular locations within store 10 or other commercial establishment. Such a transmitter used to transmit a commercial establishment signal, containing data such as store identification data, store location data or other data representing a commercial establishment, comprises an RF transmitter in certain embodiments, and in others comprises a light signal transmitter which transmits infrared or visible light.

In still other embodiments, an acoustic transmitter is employed to transmit the commercial establishment signal. An embodiment of such an acoustic transmitter is illustrated in FIG. 14 as acoustic transmitter 812. Acoustic transmitter 812 is positioned to emit acoustic energy such as broadcast, streaming or reproduced audio (for example, music) and/or public address audio (such as announcements to shoppers), within the commercial establishment, such as store 10. A source of such audio is represented by device 816 of transmitter 812.

Acoustic transmitter 812 also comprises an encoder 820 which receives the audio from source 816 and encodes the commercial establishment data therein. Encoder 820 evaluates the ability of the received audio to mask the data when encoded in the audio and produces or adjusts the level, frequency, phase and/or other characteristic of the data to be encoded or as encoded, so that the code is inaudible when the audio is reproduced as sound. The encoded audio is output by the encoder 820 to a speaker 824 which emits the encoded audio as acoustic energy.

The encoder 820 in certain embodiments comprises an encoder of the kind disclosed in U.S. patent application Ser. No. 10/302,309 in the names of James M. Jensen and Alan R. Neuhauser, assigned to the assignee of the present application and incorporated herein by reference in its entirety and/or of the kind disclosed in U.S. Pat. No. 5,764,763 in the names of James M. Jensen, et al, assigned to the assignee of the present application and incorporated herein by reference in its entirety.

In certain embodiments the audio supplied from the source 816 is already encoded with the commercial establishment signal, for example, by encoding the audio and storing it for later reproduction. In still other embodiments, rather than encode an audio signal the acoustic transmitter samples the ambient acoustic energy to evaluate its ability to mask the commercial establishment signal and emits the commercial establishment signal having appropriate characteristics to ensure that the ambient acoustic energy will mask it. Embodiments of such acoustic transmitters are disclosed in U.S. published patent application 20030171833 A1, mentioned above.

In certain embodiments of the present invention which employ acoustic transmitters to transmit location signals and/or commercial establishment signals, the personal monitor 24 employs the microphone 822 to receive such acoustic signals and detects the data therein by means of the processor 830. In certain ones of such embodiments, the processor 830 advantageously employs a detection technique disclosed in U.S. Pat. No. 5,764,763, mentioned above, to detect the data encoded in the various acoustic signals.

In certain embodiments, acoustic transmitters are employed both to emit location signals at various locations throughout a commercial establishment, but also to transmit a commercial establishment signal. In such embodiments it is possible to dispense with the use of an RF receiver in monitor 24. In certain ones of such embodiments used to monitor a panelist's presence at or near a small commercial establishment, such as a kiosk in a shopping mall, an acoustic transmitter is employed to transmit an acoustic signal in the vicinity of the commercial establishment containing commercial establishment data identifying or otherwise relating to it. When a panelist carrying a monitor 24 approaches such a commercial establishment closely enough so that the panelist can perceive it or the products or services it offers, the monitor 24 detects and stores the commercial establishment data to record the panelist's presence.

In certain embodiments wherein the location transmitters 36, 40, 56, 70 and 78 comprise acoustic transmitters, the acoustic transmitters transmit acoustic signals containing both location data and commercial establishment data to the monitor 24 which detects and stores both of these data from the received acoustic signal. In certain advantageous embodiments, both the location data and the commercial establishment data are encoded and detected according to techniques disclosed in U.S. patent application Ser. No. 10/302,309, mentioned above. In one such encoding technique, the location data and commercial establishment data are transmitted repeatedly, but each has a different duration. The monitor 24 employs two accumulators, one of which is a register having a length selected to accumulate the location data and the other of which is a different register having a length selected to accumulate the commercial establishment data. Although components of each of the data are accumulated in both registers, a register having a length selected to accumulate the location data, for example, will additively accumulate components of the location data, but will not accumulate corresponding components of the commercial establishment data, so that the commercial establishment data will appear as noise in this register.

Figure 15:
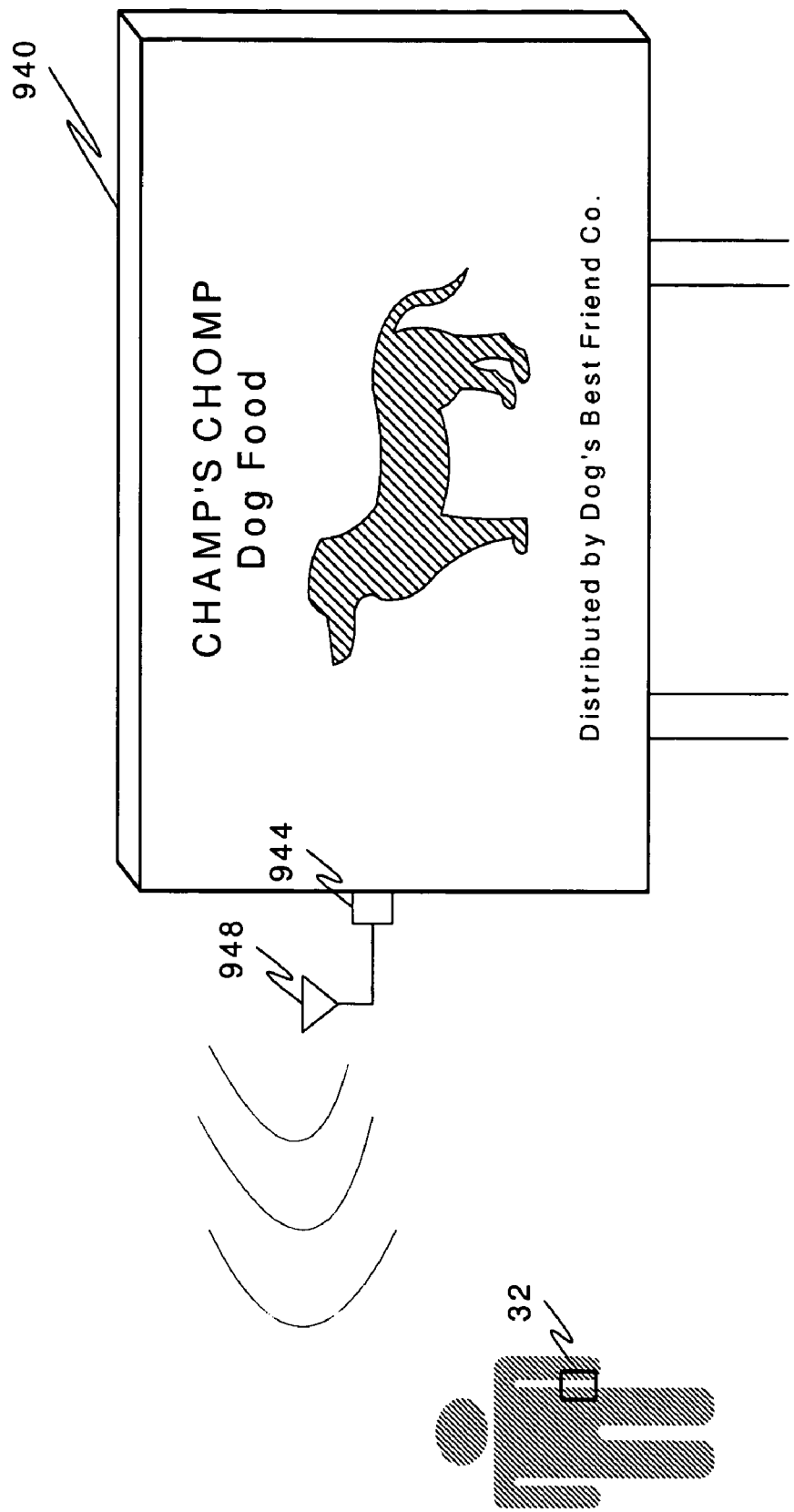
FIG. 15 illustrates use of the portable monitor for measuring exposure of the panelist carrying the portable monitor to a media display.

In certain embodiments portable monitor 24 serves to monitor exposure to media displays in outdoor settings, such as highways, railways, and walkways, and/or in indoor settings, such as malls, subways, railway stations, bus stations, airports and building lobbies. FIG. 15 illustrates a use of monitor 24 for this purpose, in particular, to monitor exposure of a panelist carrying portable monitor 24 to a billboard advertisement, in FIG. 15 shown as an advertisement 940 for a fictitious dog food product. In the embodiment of FIG. 15, an RF transmitter 944 drives an antenna 948 to transmit a billboard proximity signal at a power level chosen to ensure that billboard proximity data contained in the signal can only be detected by portable monitor 24 when it is positioned at a location from which the panelist can view the billboard advertisement. The billboard proximity data is stored by the monitor 24 along with a time stamp representing a-time of exposure to the billboard advertisement 940. Preferably, the time stamp is obtained from the same source as that stored with the data indicating detection of the location data so that the time stamps are all on the same predetermined time base.

In certain embodiments receiver 814 of portable monitor 24 is arranged to receive the billboard proximity signal and detect the billboard proximity data therein. In other embodiments, a different wireless receiver is included in monitor 24 for this purpose. Further embodiments of media display exposure monitoring means suitable for use in monitor 24 are disclosed in U.S. patent application Ser. No. 10/329,132 in the names of Jack K. Zhang, Jack C. Crystal and James M. Jensen, assigned to the assignee of the present application and hereby incorporated by reference herein in its entirety. Still further embodiments of media display exposure monitoring means suitable for use in monitor 24 are disclosed in U.S. patent application Ser. No. 10/640,104 in the names of Jack K. Zhang, Jack C. Crystal, James M. Jensen and Eugene L. Flanagan III, assigned to the assignee of the present application and hereby incorporated by reference herein in its entirety.

FIG. 16 illustrates a system for communicating the data stored in the personal monitor 24, as well as other personal monitors 24 assigned to other members of the same household acting as panelists in the same study, to a centralized processor 1066 for use in producing reports of interest to store managers, distributors, manufacturers, other advertisers, media organizations, etc. In certain embodiments, from time to time, or periodically, each panelist in the household docks his/her portable monitor 24 in a respective base station 1050, 1054 to download data stored in the portable monitors. The monitor 24 communicates with the base station by means of the coupling device 836 (see FIG. 14), which in certain embodiments is an optoelectronic coupling device. In certain embodiments, the monitor communicates with the base station by means of an RF transceiver or other wireless transceiver (not shown for purposes of simplicity and clarity) without docking the monitor in the base station. This communication is initiated either by the monitor 24 or the base station 1050, 1054, periodically, at a predetermined time or from time to time. In certain further embodiments, the portable monitor 24 comprises a wireless network transceiver (not shown for purposes of simplicity and clarity) to establish a wireless link 1064 to the communications network 1062 to download data, using a WiFi or other wireless networking protocol. In still further embodiments, the portable monitor 24 comprises a cellular telephone module (not shown for purposes of simplicity and clarity) to establish a wireless link with a telephone network to download data.

Once the data has been downloaded, the memory 834 of the monitor 24 is reset to store further data. The base stations may be, for example, those disclosed in U.S. Pat. No. 5,483,276 to Brooks, et al., assigned to the assignee of the present invention and hereby incorporated herein by reference in its entirety. The base stations 1050, 1054 communicate with a communications hub 1058 also located in the household for communication via a network 1062 to the centralized processor 166 located remotely from the household. The centralized processor 1066 likewise receives data from other panelists' households to produce reports as mentioned above.

The centralized processor 1066 stores the received data in one or more databases from which it is accessed to produce such reports. A relational database for use in storing the downloaded data gathered by monitors 32 in various commercial establishments, for use in producing reports concerning consumer behavior in such commercial establishments, is now described with reference to FIGS. 3 and 8. FIG. 17 illustrates a table 1170 that stores records identifying the various transmitters 86 (FIG. 14) employed in the consumer behavior study by transmitter ID along with the commercial establishment (a store in this illustration) in which it is located and the specific location of the transmitter therein. For example, row 1174 of table 1170 provides an exemplary record for a transmitter having ID "9562" installed in a fictitious retail store, Ed's Emporium, in the village of Bayville and located near the entrance of this store.

Table 1170 also provides data identifying a product or promotional display at the location of certain ones of the transmitters 86, as well as the distributor or manufacturer of such product or promotional display. For example, row 1178 of FIG. 17 provides an exemplary record for a transmitter having transmitter ID "8723" installed in the fictitious retail store mentioned above and at the location of a fictitious product, Champ's Chomp dog food, offered for sale in the store. The record of row 1178 also identifies the manufacturer or distributor of the product, here indicated as a fictitious business entity, Dog's Best Friend. Similarly, table 1170 includes many other such records, each for a respective transmitter identified by its transmitter ID, and indicating its location by store, in-store location and store owner or client, and as appropriate, either the product or promotional display at such location, and its distributor or manufacturer. It is noted that all of the clients or store owners, as well as the products and their respective manufacturers or distributors listed in table 1170, are fictitious and serve only to illustrate exemplary records.

In certain embodiments, the table of FIG. 17 is compiled from data supplied by personnel engaged to install the transmitters in the various commercial establishments participating in the study. In certain embodiments, the data is supplied in written form by such personnel to data entry personnel who populate the table 1170 of FIG. 17. In certain embodiments, the personnel instead log the locations of previously installed wireless transmitters and distinctive data provided thereby. Such previously installed transmitters include wireless communication devices installed with intelligent shelves. The intelligent shelves serve to gather data concerning the products placed thereon for inventory control purposes and communicate such data as well as the identity of the intelligent shelf to a data gathering system of the commercial establishment. Certain embodiments of the present invention make use of the identity data where it is transmitted wirelessly from the intelligent shelf. Certain of these embodiments also gather data concerning the products placed on the intelligent shelves for populating the "product" field of the table of FIG. 17. Preferably the data is compiled in the table from records communicated from portable electronic devices in the possession of the personnel installing or logging the transmitters in the various participating establishments. Suitable electronic devices for this purpose are disclosed in U.S. patent application Ser. No. 10/800,884 filed Mar. 15, 2004 in the names of Jack K. Zhang and James M. Jensen.

As described above, FIG. 12 illustrates a table recording detections of various ones of the transmitters 686 by the monitor 24, along with the times at which each was detected and the duration of continuous detection of the same transmitter location signal. The table of FIG. 12, together with the table of FIG. 17 comprise a relational database providing the ability to map panelist exposures to various products and promotional displays within the participating commercial establishments as well as to assess traffic flow through the participating commercial establishments. It is thus possible to produce reports of various kinds useful to the managers of such commercial establishments as well as the distributors and manufacturers whose products are offered for sale therein.

In certain ones of such reports, the presence/exposure data of FIG. 12 and the data of FIG. 17 is processed to estimate the frequency, duration and density of exposure of consumers to various locations, products and promotional displays within each of the participating establishments whether based on time of day or otherwise. By means of the table of FIG. 17, such data is readily presented by overlaying the same on a layout map of the establishment, and the identity of the products and promotional materials at the corresponding locations is likewise readily presented on the same map as an overlay in correspondence with the frequency, duration and density of exposure data described above to enable store managers, manufacturers and distributors to assess the exposure of various products and promotional materials in the store or other establishment. It is thus possible based on such reports to formulate placement recommendations for products and promotional materials in retail stores.

It is likewise possible with the same data to produce traffic flow reports which enable the store managers to determine the locations of "hot spots" and "cold spots" within their commercial establishments. Store managers are thus enabled to evaluate whether changes should be made in the layouts of their establishments to improve customer traffic and increase exposure of product and service offerings.

As noted above, in certain embodiments of the personal monitors 24, not only is such data gathered but also data indicating exposure to media data such as television and radio broadcast exposure, as well as exposure to media displays, both outdoor and indoor. The systems and methods of the present inventions thus provide integrated data measuring not only behavior of consumers within commercial establishments but also exposure of such consumers to media data and the advertisements conveyed thereby. It is thus possible to evaluate the effects of the exposure to advertising of predetermined individuals to their behavior in commercial establishments, especially in regard to interest in particular products that may be stimulated by such advertising.

Further embodiments of a system and method for monitoring the presence and movements of a panelist within a commercial establishment in accordance with certain embodiments of the present invention are now described. In certain embodiments the receiver 814 of portable monitor 24 receives one or more signals from one or more wireless transmitters within or near the commercial establishment, but not associated with particular locations within the commercial establishment, and generates location data indicative of a location of the portable monitor 24 within the commercial establishment based upon the received signals. In other embodiments, the monitor 24 includes a GPS receiver (not shown for purposes of simplicity and clarity) to obtain such position data in the form of latitude and longitude. In certain advantageous embodiments, the monitor employs an assisted GPS location system.

In certain other embodiments the portable monitor transmits a signal that is received by one or more receiving devices within or near the commercial establishment to determine the location of the portable monitor. In still other embodiments, the portable monitor includes a cellular telephone module (not shown for purposes of simplicity and clarity) that communicates with a cellular telephone system to obtain data therefrom representing the location of the portable monitor 24 based on signals received from the cellular telephone module. Such location data is provided as latitude and longitude or in another usable form. In still further embodiments, the portable monitor 24 employs at least one of the following techniques to generate the location data: an angle of arrival (AOA) technique, a time difference of arrival (TDOA) technique, an enhanced signal strength (ESS) technique, a location fingerprinting technique, and an ultra wideband location technique. Each of these techniques is now briefly described.

The angle of arrival (AOA) technique determines the direction of a signal received from a radio frequency (RF) transmitter. This can be done by pointing a directional antenna along the line of maximum signal strength. Alternatively, signal direction can be determined from the difference in time of arrival of the incoming signals at different elements of the antenna. A two-element antenna is typically used to cover angles of ±60 degrees. To achieve 360-degree coverage, a six-element antenna can be used. However, a single mobile directional antenna can give only the bearing, not the position, of a transmitting object.

With two directional antennas spaced well apart, however, the position of a transmitting device in a plane can be computed. In this method, also known as the angle of arrival (AOA) method, transmitter position is determined from the known (fixed) position of the receivers' antennas and the angle of arrival of the signals with respect to the antennas. In certain embodiments the portable monitor 24 includes a transmitter that enables its location to be determined in accordance with the angle of arrival method.

The time difference of arrival (TDOA) technique is based upon the similar concept that the difference in time of arrival between signals received at antennas at different locations can be used to determine position. Given the speed of light and known transmit and receive times, the distance between a transmitter and the receiver antenna can be calculated. In certain embodiments the portable monitor 24 includes a transmitter that enables its location to be determined in accordance with the time difference of arrival technique.

In an alternative time difference scheme, the monitor and the antennas reverse roles: the antennas are transmitters and the portable monitor 24 incorporates a receiver. This technique is known as forward link trilateration (FLT). This is relatively simple to implement in some code-division multiple access (CDMA) wireless systems, where the time difference of arrival can be determined from the phase difference between pseudo-random noise code sequences of 0s and 1s transmitted from two antennas. In certain embodiments the portable monitor 24 includes a receiver, such as a CDMA cellular telephone receiver, that enables its location to be determined in accordance with the forward link trilateration method.

When the term "time difference of arrival technique" is used herein, the term is meant to encompass both the traditional time difference of arrival (TDOA) method and the forward link trilateration (FLT) method.

The enhanced signal strength (ESS) method provides improvements over conventional signal strength methods by overcoming such impediments as multipath effects, attenuation, and antenna orientation. The method involves taking in three-dimensional information on the objects, walls, and other features and obstructions within the commercial establishment, and using such information to simulate the RF signal propagation characteristics of wireless transmitting antennas in the area. A location system center stores the results in an RF database. The position of the portable monitor is determined by getting it to measure the signal strength of preferably three to five base transmitters. From this input plus information from the database, the system can calculate the position of the portable monitor. Inside large commercial establishments, such as malls and department stores with appropriate base transmitters located therein, the position of a portable monitor can be determined by means of the ESS method. In certain embodiments the portable monitor 24 includes a receiver that enables its location to be determined in accordance with the ESS method.

The location fingerprinting technique, instead of exploiting signal timing or signal strength, relies on signal structure characteristics. The technique turns the multipath phenomenon to good use by combining the multipath pattern with other signal characteristics, to create a signature unique to a given location. A location fingerprinting system includes a signal signature database of a location grid for a specific area. To generate this database, a device is walked through the area transmitting or receiving signals to or from a monitoring site. The system analyzes the incoming signals, compiles a unique signature for each square in the location grid, and stores it in the database.

To determine the position of a mobile transmitter or receiver, the system matches the transmitter's or receiver's signal signature to an entry in the database. Multipoint signal reception is not required, although it is preferable. The system can use data from only a single point to determine location. In certain embodiments the portable monitor 24 includes a transmitter or a receiver that enables its location to be determined in accordance with the location fingerprinting technique.

In certain ultra wideband location techniques a network of localizers determine relative locations in three-dimensional space by measuring propagation times of pseudorandom sequences of electromagnetic impulses. The propagation time is determined from a correlator which provides an analog pseudo-autocorrelation function sampled at discrete time bins. The correlator has a number of integrators, each integrator providing a signal proportional to the time integral of the product of the expected pulse sequence delayed by one of the discrete time bins, and the non-delayed received antenna signal. Using pattern recognition the arrival time of the received signal can be determined to within a time much smaller than the separation between bins.

In certain ultra wideband techniques, wireless ultra wideband transceivers are positioned at known stationary locations within the area to be monitored, and the portable monitor 24 includes a wireless ultra wideband receiver/processor that receives one or more timed pulses from the various transceivers and resolves the location of the portable monitor within the monitored area based on the locations of the ultra wideband transceivers and time-of-flight measurements of the pulse or pulses. In certain embodiments, the portable monitor 24 includes an ultra wideband transmitter and a plurality of interacting receivers in stationary positions receive a pulse from the transmitter of the portable monitor 24 to determine its location. In certain of the embodiments, the stationary transceivers or receivers are coupled by cabling, while in others they are untethered.

Figure 18:
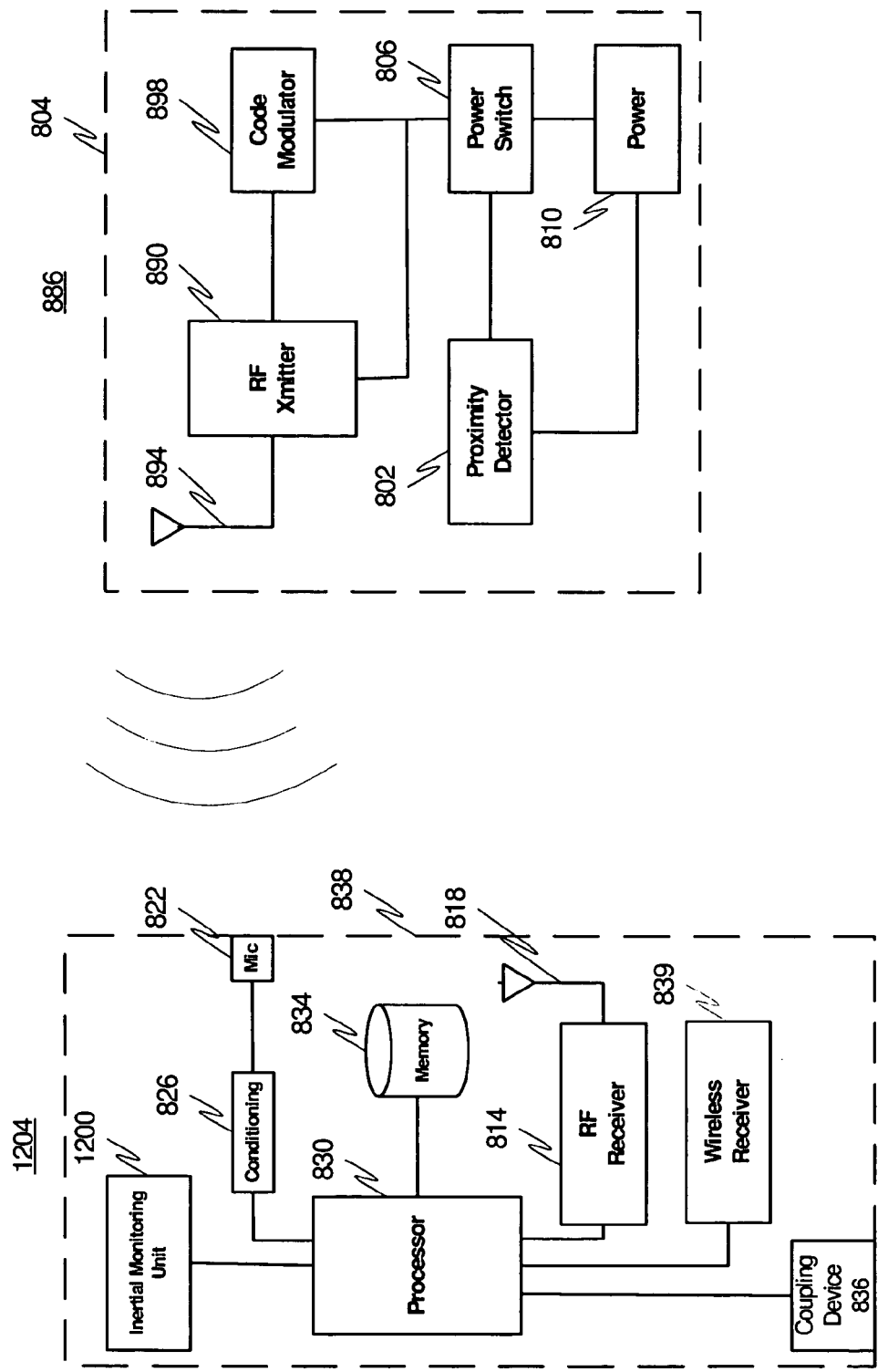
FIG. 18 provides block diagrams of certain embodiments of a location signal transmitter and portable monitor wherein the portable monitor tracks its location using an inertial monitoring device.

Referring now to FIG. 18, a system is illustrated in block form for measuring the exposure of a panelist to media data and media displays, as well as for monitoring the presence and movements of the panelist within a commercial establishment, in accordance with certain embodiments of the present invention. In FIG. 18, elements corresponding to those of FIG. 14 bear the same reference numerals. Similarly to the system shown in FIG. 14, the system of FIG. 18 includes a portable monitor 1204 arranged to be carried on the person of a panelist. The portable monitor 1204 receives one or more signals from one or more terrestrial sources and/or satellite sources, and generates data indicative of a location of the portable monitor 1204. In certain embodiments, the signals used for this purpose are obtained from a cellular telephone system or from a GPS or assisted GPS receiver, as described above. However, in the system of FIG. 18, the location data is provided by an inertial monitoring device 1200 which forms a part of portable monitor 1204 and the received signals are used to provide location calibration data to the inertial monitoring device. Such calibration, which is described more fully below, may be performed periodically or from time to time, or whenever the signals from the terrestrial and/or satellite sources are received.

In the embodiment of FIG. 18 the inertial monitoring device 1200 of the portable monitor 1204 is calibrated by means of a signal transmitted by a calibration transmitter or transmitters 86 located in or in proximity to a commercial establishment in which the movements of the panelist wearing the monitor are to be tracked. Advantageously, in certain embodiments the calibration transmitter or transmitters are located by an entrance or exit of the establishment through which the panelist must pass to enter or leave the commercial establishment. The calibration signal is transmitted at sufficiently low power to ensure that it will be received only when the portable monitor is close by.

The inertial monitoring device preferably is small in size and lightweight. An advantageous embodiment of such an inertial monitoring device employs microelectromechanical sensors (MEMS) as either gyroscopic sensors and/or accelerometers to provide data from which the location of the monitor can be determined.

In certain embodiments to calibrate the inertial monitoring device 1200 the portable monitor 1204 employs satellite-based techniques, such as global positioning system (GPS) and/or server assisted GPS technology, and/or terrestrial techniques, such as an angle of arrival (AOA) technique, a time difference of arrival (TDOA) technique, an enhanced signal strength (ESS) technique, a location fingerprinting technique, and/or an ultra wideband location technique.

Monitoring Exposure to Products

The monitor 24 of FIGS. 1A, 1B and 1C is useful for monitoring the exposure of customers to products, but is particularly useful for gathering such data in retail stores as well as in all other kinds of commercial establishments. FIG. 1C schematically illustrates an aisle of a retail store adjacent a group of shelves 38 on which products are arranged for sale. The portable monitor 24 is carried on the person of a panelist participating in a market research study to monitor the exposure of the panelist to various predetermined products.

The RF transmitter 40 is placed in the vicinity of a particular product offered for sale, here indicated as a fictitious product, Champs Chomp dog food. The RF transmitter 40 transmits a product signal containing data identifying the product of interest, its manufacturer, distributor, and/or otherwise containing data corresponding to the product. Such data in certain embodiments comprises a transmitter identification code that uniquely identifies the transmitter 36, and from which data relating to the product can be obtained. In certain embodiments the product signal includes commercial establishment data identifying or otherwise relating to the commercial establishment in which the panelist is present. In certain embodiments, the commercial establishment data directly identifies the commercial establishment, while in others the commercial establishment data is used to access or derive such identity. In certain embodiments, the commercial establishment data relates to the commercial establishment, with or without identifying it directly or indirectly. The frequency or frequencies of the product signal can be selected from any permissible frequency range, up to and including microwave frequencies.

As the panelist wearing the portable monitor 24 draws near to the product, the monitor 24 receives the product signal and detects the data contained therein. The strength of the transmitted product signal, along with the sensitivity of the monitor 24 are selected to ensure that monitor 24 will only detect the data contained in the product signal when it is sufficiently near the predetermined product for the purposes of the study. In certain advantageous embodiments, one or both of the strength of the location signal and the sensitivity of the monitor are selected to ensure that the monitor 24 will only detect the data in the product signal when the monitor is located within a predetermined area to be monitored, such as a predetermined area in which the predetermined product or a product display containing the product can be perceived by the panelist. When the monitor 24 detects the data contained in the product signal, it stores either the data or data based thereon, together with a time stamp indicating the time at which the data was received.

If the panelist lingers in the vicinity of transmitter 40, this indicates that the panelist may be interested in purchasing the adjacent product. Accordingly, periodically or from time to time the monitor 24 checks for the detection of the data contained in the same or a different product signal. If the data of the same product signal has again been detected, the monitor 24 stores further data indicating a duration of the continuous presence of the panelist in the vicinity of transmitter 40.

Figure 19:
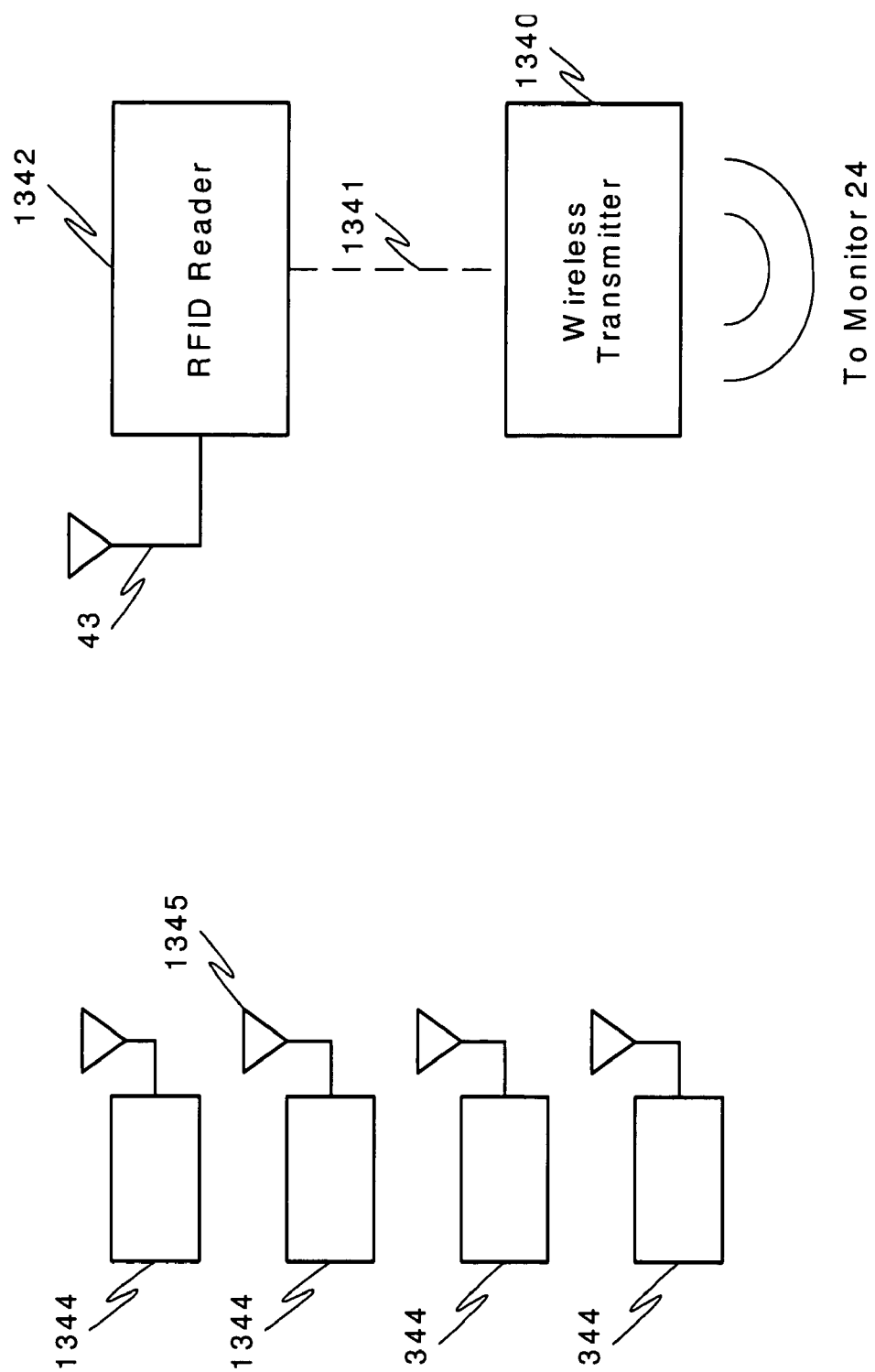
FIG. 19 illustrates use of a portable monitor communicating with an intelligent shelf system employed within a commercial establishment.

In certain embodiments, the transmitter 40 cooperates with an intelligent shelf system of the commercial establishment to gather product data. FIG. 19 illustrates such a cooperative relationship, in which the wireless transmitter 40 communicates with an RFID reader system 1342 through a wired or wireless communications link 1341 to obtain the product data therefrom. The RFID reader 1342 gathers data identifying or otherwise relating to products on its shelf or other product presentation device, so that the product data is maintained up-to-date despite stocking or removal of products. For this purpose, the reader 1342 transmits an RF signal to RFID tags (symbolized by antennas 1345 in FIG. 19) associated with various products 1344 on its shelf or other device to energize or trigger them to respond with product data. When the monitor 24 comes within range of the wireless transmitter 40, it communicates the up-to-date product data thereto.

Where the product signal transmitted by the transmitter 40 contains transmitter identification data, this transmitter identification data is also stored in a database where it is associated with data identifying the product or otherwise relating to it. FIG. 20 illustrates an embodiment of a table storing the data detected by the monitor 24 from various product signals, together with time stamps indicating a time of detection of the data and the duration of continuous detection of the same data. In the exemplary table of FIG. 20, each row represents a record of the detection of the data from a respective transmitter, here represented as a transmitter ID, along with a monitor ID (which corresponds to the panelist to whom the particular monitor has been assigned), the time at which the data from that transmitter was first detected and a duration of continuous detection of the data from such transmitter. In certain other embodiments the data detected by the monitor is stored without the monitor ID which is not associated with the other stored data until it has been downloaded from the monitor 24.

A first record 1448 of the FIG. 20 table is an example of the data stored by portable monitor 24 upon detection of the data contained in the product signal received from transmitter 40 (having transmitter ID 8723) when the panelist approaches the transmitter 40 and its corresponding product. Here the record indicates that the panelist remained for 20 seconds indicating interest in Champs Chomp dog food in Ed's Emporium.

A further record 1452 of the FIG. 20 table represents data gathered by the monitor as the panelist pauses in the vicinity of a transmitter 56 (having transmitter ID 2321) shown in FIG. 13 mounted on an in-store product display 760 for a fictitious soft drink product, Double Whammy cola. As shown in FIG. 13, the product display 760 serves to attract attention to the product 766 which it carries or contains. As the panelist stops by the product display 760, the monitor records data indicating the duration of the panelist's presence near the product display providing an indication of its effectiveness in attracting consumer attention.

As the panelist proceeds through the store, the monitor 24 detects data contained in further product signal indicating that the panelist has approached another predetermined product involved in the study. The detected data is stored by the monitor 24 in a record such as exemplary record 1474 shown in FIG. 20. Still later the panelist pauses in the vicinity of another to examine still another product involved in the study, as indicated by record 1482 in FIG. 20.

With reference again to FIG. 14, in use to detect exposure to a product, the RF transmitter 890 drives antenna 894 to transmit an RF product signal within an appropriate band selected as any permissible RF band up to and including microwave frequencies. In certain embodiments the RF transmitter 890 produces the product signal in an unlicensed 900 MHz band and at a sufficiently low power level so that its data will be detectable by monitor 24 only within a relatively short range.

The data contained by the product signal is produced by code modulator 898 and applied as a modulating signal by code modulator 898 to RF transmitter 890. The product signal can be modulated in any manner that is compatible with the detection capabilities of portable monitor 24, such as by amplitude, frequency, pulse or phase modulation or any combination thereof. In certain embodiments the data is simply represented by the frequency of the product signal, so that a separate code modulator is not required. In certain embodiments, the data modulates the product signal to produce a periodically repeating code. As an example, such a code could repeat every 10 seconds during the transmission of the product signal, although a different repetition rate could be selected depending on the amount of data that must be transmitted and the detection error rate of the personal monitor 24 within the desired detection area.

The power source 810 is selected as one that is capable of supplying sufficient power for a desired duration, such as the duration of the marketing study. The power source 810 in certain embodiments is selected as a rechargeable battery, a non-rechargeable battery, an energy storage device, a photoelectric power source and/or a different energy receiving device such as an antenna receiving energy from the portable monitor 24 or other external source.

In certain embodiments rather than transmit upon detection of a person in proximity to the transmitter 886, the RF transmitter 890 transmits the product signal periodically. In still other embodiments the RF transmitter 890 transmits the product signal in response to a query signal transmitted from a transmitter included in the portable monitor 24 (not shown for purposes of simplicity and clarity). In certain embodiments, the transmitter is an RFID tag that receives a read signal from the monitor 24, and uses the energy of the received read signal to encode its data and retransmit the encoded data as a location signal. In certain ones of such embodiments, the RFID tag is affixed to the product itself or its packaging. In embodiments which employ RFID tags, it is advantageous to selectively key the monitor on to transmit such read signal as infrequently as possible, due to the relatively large amount of energy that must be transmitted by the monitor 24 to energize the RFID tag to retransmit a detectable product signal. For this purpose, in certain embodiments a transmitter is provided in or near the commercial establishment to key the monitor to transmit the read signal.

In certain embodiments, transmitters provided with an active power source, such as a battery, photoelectric cell or the like, are affixed to the product itself or its packaging, rather than attached to or placed on or in a nearby shelf or other fixture.

RF receiver 814 of monitor 24 has an input coupled with antenna 818 to receive the product signal and is operative to detect the data therein and supply it at an output coupled with processor 830 in a form suitable for input to the processor 830. Preferably, the receiver 814 is operated only periodically, or from time to time, in order to conserve power in the portable monitor 24. For example, in certain embodiments the receiver 814 is turned on for a 10 second period during a repeating 30 second interval.

Where the transmitter 886 transmits the product signal in a different form, such as infrared or visible light, wireless receiver 814 and antenna 818 are replaced in other embodiments of the portable monitor 24 by a suitable light sensor and conditioning circuitry coupled with the light sensor and operative to detect the data contained in the product signal and supply it in a suitable form to the processor 830. Where the transmitter 886 instead transmits an acoustic product signal, in certain embodiments of portable monitor 24 the microphone 822 and conditioning circuitry 826 serve to receive the product signal and supply it in suitable form to the processor 830. In certain ones of such embodiments the processor 830 serves to detect the data contained in the product signal transmitted in acoustic form.

The processor 830 is also operative to store the detected product data with a time stamp produced by processor 830 or else by a separate clock (not shown for purposes of simplicity and clarity). Where the processor continues to detect the same product signal data, in certain embodiments it produces duration data indicating a duration of continuous receipt of the same product signal data and stores it in association with the location data and time stamp. In certain other embodiments, in place of duration data, the processor instead stores an ending time stamp representing a point in time when it no longer continues to receive the same product signal data. In still other embodiments, the processor simply stores each detection of the product signal data with a respective time stamp associated therewith.

As described hereinabove, the embodiments of portable monitor 24 illustrated in FIG. 14 also serve to monitor exposure of the panelist to media data having an acoustic component, such as radio and television broadcasts, prerecorded content and streaming media. The monitor 24 stores such media data exposure data in storage 834 together with time stamps representing timing of exposure thereto. Preferably, the time stamp is obtained from the same source as that stored with the data indicating detection of the product signal data so that the time stamps are all on the same predetermined time base.

In certain embodiments, acoustic transmitters are employed both to emit product signals within a commercial establishment, but also to transmit a commercial establishment signal. In such embodiments it is possible to dispense with the use of an RF receiver in monitor 24.

In certain embodiments wherein the product signal transmitters comprise acoustic transmitters, the acoustic transmitters transmit acoustic signals containing both product data and commercial establishment data to the monitor 24 which detects and stores both of these data from the received acoustic signal. In certain advantageous embodiments, both the product data and the commercial establishment data are encoded and detected according to techniques disclosed in U.S. patent application Ser. No. 10/302,309, mentioned above. In one such encoding technique, the product data and commercial establishment data are transmitted repeatedly, but each has a different duration. The monitor 24 employs two accumulators, one of which is a register having a length selected to accumulate the product data and the other of which is a different register having a length selected to accumulate the commercial establishment data. Although components of each of the data are accumulated in both registers, a register having a length selected to accumulate the product data, for example, will additively accumulate components of the product data, but will not accumulate corresponding components of the commercial establishment data, so that the commercial establishment data will appear as noise in this register.

As described above, in certain embodiments portable monitor 24 serves to monitor exposure to outdoor advertising in settings such as highways, railways, and walkways, malls, subways, railway stations, bus stations, airports and building lobbies by detecting billboard proximity data. The billboard proximity data is stored by the monitor 24 along with a time stamp representing a time of exposure to the billboard advertisement. Preferably, the time stamp is obtained from the same source as that stored with the data indicating detection of the product signal data so that the time stamps are all on the same predetermined time base.

As described above in connection with FIG. 16, the centralized processor 1066 stores the received data in one or more databases from which it is accessed to produce such reports. A relational database for use in storing the downloaded data gathered by monitors 32 in various commercial establishments, for use in producing reports concerning exposure to products in such commercial establishments, is now described with reference to FIGS. 20 and 21. FIG. 21 illustrates a table 1570 that stores records identifying the various transmitters, such as transmitter 40 in FIG. 1C, employed in the product exposure study by transmitter ID along with the commercial establishment (a store in this illustration) in which it is located and the product it represents. For example, row 1578 of table 1570 provides an exemplaryrecord for a transmitter having ID "8723" present in a fictitious retail store, Ed's Emporium, in the village of Bayville to represent a fictitious product, Champ's Chomp dog food, offered for sale in this store, as well as the distributor or manufacturer of such product. For example, row 1578 of FIG. 21 provides an exemplaryrecord for a transmitter having transmitter ID "8723" installed in the fictitious retail store mentioned above and at the location of a fictitious product, Champ's Chomp dog food, offered for sale in the store. The record of row 1578 also identifies the manufacturer or distributor of the product, here indicated as a fictitious business entity, Dog's Best Friend. Similarly, table 1570 includes many other such records, each for a respective transmitter identified by its transmitter ID, and indicating the product it represents, its distributor or manufacturer and the store in which it is offered for sale. It is noted that all of the clients or store owners, as well as the products and their respective manufacturers or distributors listed in table 1570, are fictitious and serve only to illustrate exemplary records.

In certain embodiments, the table of FIG. 21 is compiled from data supplied by personnel engaged to place the transmitters in the various commercial establishments participating in the study. In certain embodiments, the data is supplied in written form by such personnel to data entry personnel who populate the table 1570 of FIG. 21. Preferably the data is compiled in the table from records communicated from portable electronic devices in the possession of the personnel installing the transmitters in the various participating establishments. Suitable electronic devices for this purpose are disclosed in U.S. patent application Ser. No. 10/800,884 filed Mar. 15, 2004 in the names of Jack K. Zhang and James M. Jensen.

In certain embodiments, the data used to populate the table of FIG. 21 is obtained from the product manufacturers or distributors, and/or from the commercial establsihments.

As described above, FIG. 20 illustrates a table recording detections of various ones of the transmitters, such as transmitter 40 of FIG. 1C, by the monitor 24, along with the times at which each was detected and the duration of continuous detection of the same transmitter's signal. The table of FIG. 20, together with the table of FIG. 21 comprise a relational database providing the ability to map panelist exposures to various products and promotional displays within the participating commercial establishments. It is thus possible to produce reports of various kinds useful to the managers of such commercial establishments as well as the distributors and manufacturers whose products are offered for sale therein.

In certain ones of such reports, the exposure data of FIG. 20 and the data of FIG. 21 are processed to estimate the frequency, duration and density of exposure of consumers to various products and promotional displays within each of the participating establishments whether based on time of day or otherwise As noted above, in certain embodiments of the personal monitors 24, not only is such data gathered but also data indicating exposure to media data such as television and radio broadcast exposure, as well as exposure to media displays, both outdoor and indoor and to publications. The systems and methods of the present inventions thus provide integrated data estimating not only exposure of consumers to products but also exposure of such consumers to media data, publications and the advertisements conveyed thereby. It is thus possible to evaluate the effects of the exposure to advertising of predetermined individuals to their interest in particular products that may be stimulated by such advertising.

Further embodiments of a system and method for monitoring exposure of a panelist to one or more products within a commercial establishment in accordance with certain embodiments of the present invention are now described. In certain embodiments the receiver 814 of portable monitor 1204 receives one or more signals from one or more wireless transmitters within or near the commercial establishment, but not associated with particular locations within the commercial establishment, and generates location data indicative of a location of the portable monitor 24 within the commercial establishment based upon the received signals. Such location data is used to assess exposure of the panelist to a product or products at or near the location represented by such location data. In other embodiments, the monitor 24 includes a GPS receiver (not shown for purposes of simplicity and clarity) to obtain such position data in the form of latitude and longitude. In certain advantageous embodiments, the monitor employs an assisted GPS location system.

In certain other embodiments the portable monitor transmits a signal that is received by one or more receiving devices within or near the commercial establishment to determine the location of the portable monitor. In still other embodiments, the portable monitor includes a cellular telephone module (not shown for purposes of simplicity and clarity) that communicates with a cellular telephone system to obtain data therefrom representing the location of the portable monitor 24 based on signals received from the cellular telephone module. Such location data is provided as latitude and longitude or in another usable form. In still further embodiments, the portable monitor 24 employs at least one of the following techniques to generate the location data: an angle of arrival (AOA) technique, a time difference of arrival (TDOA) technique, an enhanced signal strength (ESS) technique, a location fingerprinting technique, and an ultra wideband location technique. From such location data, the exposure of the panelist to one or more products at or near the location represented by the location data is inferred or assessed. Each of these techniques is now briefly described.

Figure 22:
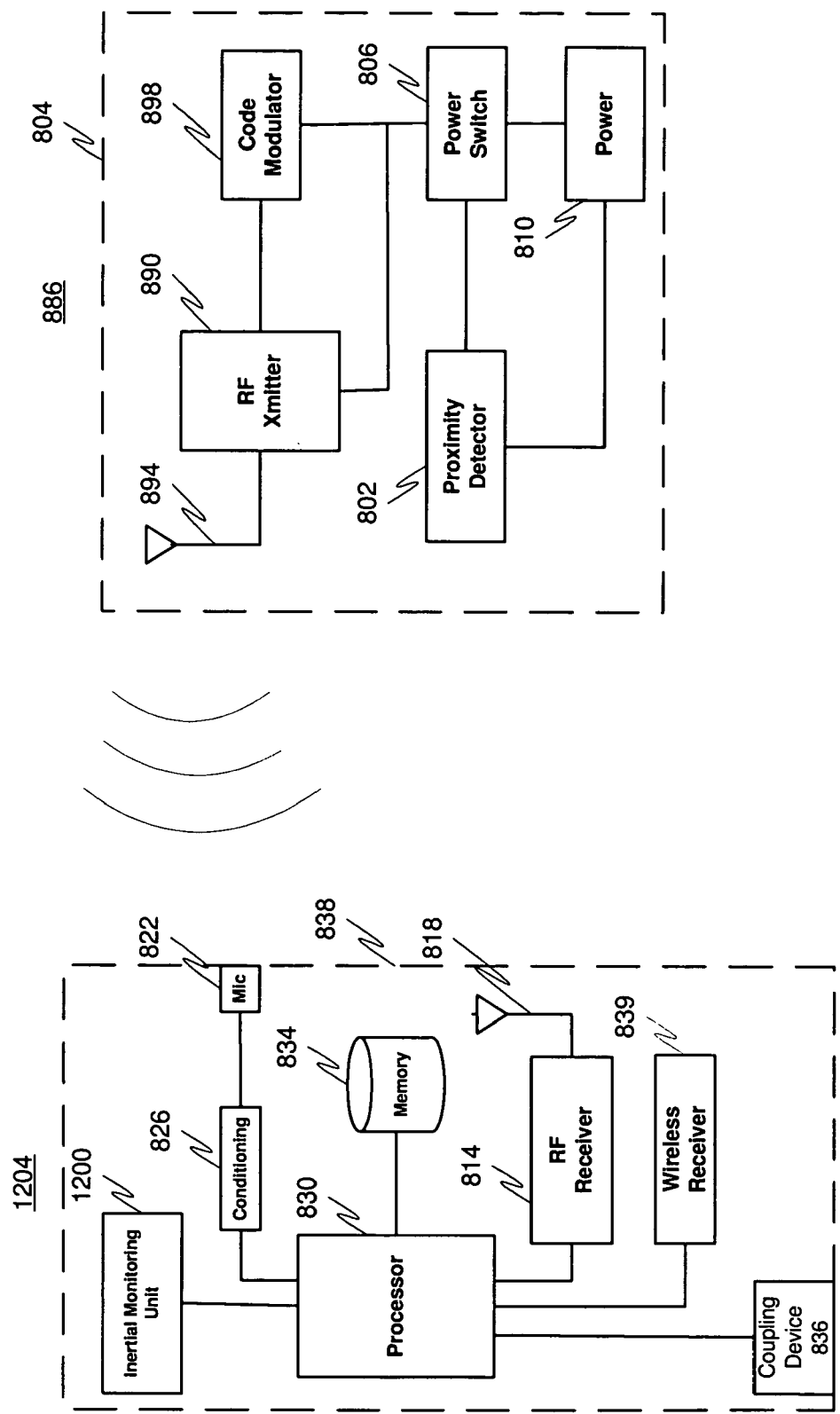
FIG. 22 provides other block diagrams of a location signal transmitter and a portable monitor.

Referring now to FIG. 22, a system is illustrated in block form for measuring the exposure of a panelist to media data and media displays, as well as for monitoring the exposure of a panelist to one or more products within a commercial establishment, in accordance with certain embodiments of the present invention. In FIG. 22, elements corresponding to those of FIG. 18 bear the same reference numerals. Similarly to the system shown in FIG. 18, the system of FIG. 22 includes a portable monitor 1204 arranged to be carried on the person of a panelist. The portable monitor 1204 receives one or more signals from one or more terrestrial sources and/or satellite sources, and generates data indicative of a location of the portable monitor 1204. In certain embodiments, the signals used for this purpose are obtained from a cellular telephone system or from a GPS or assisted GPS receiver, as described above. However, in the system of FIG. 22, the location data is provided by an inertial monitoring device 1200 which forms a part of portable monitor 1204 and the received signals are used to provide location calibration data to the inertial monitoring device. Such calibration, which is described more fully below, may be performed periodically or from time to time, or whenever the signals from the terrestrial and/or satellite sources are received.

In the embodiment of FIG. 22 the inertial monitoring device 1200 of the portable monitor 1204 is calibrated by means of a signal transmitted by a calibration transmitter or transmitters 886 located in or in proximity to a commercial establishment in which the movements of the panelist wearing the monitor are to be tracked. Advantageously, in certain embodiments the calibration transmitter or transmitters are located by an entrance or exit of the establishment through which the panelist must pass to enter or leave the commercial establishment. The calibration signal is transmitted at sufficiently low power to ensure that it will be received only when the portable monitor is close by.

The inertial monitoring device preferably is small in size and lightweight. An advantageous embodiment of such an inertial monitoring device employs microelectromechanical sensors (MEMS) as either gyroscopic sensors and/or accelerometers to provide data from which the location of the monitor can be determined.

In certain embodiments to calibrate the inertial monitoring device 1200 the portable monitor 1204 employs satellite-based techniques, such as global positioning system (GPS) and/or server assisted GPS technology, and/or terrestrial techniques, such as an angle of arrival (AOA) technique, a time difference of arrival (TDOA) technique, an enhanced signal strength (ESS) technique, a location fingerprinting technique, and/or an ultra wideband location technique.

For certain embodiments which gather location data by means of a portable monitor, a database similar to that of FIG. 21 is established but which also stores data indicating locations of the products involved in the market research. The centralized processor 1066 of FIG. 16 accesses the product location data from the database along with panelist location data obtained from various portable monitors and processes this data to produce product proximity data indicating exposure of the panelists to the predetermined products. In certain embodiments the processor 1066 processes the data to produce the product exposure data based on a comparison of the panelist location data and the product location data. In certain embodiments the processor 1066 produces the product proximity data to represent presence of one or more of the panelists in predetermined exposure areas wherein they are able to perceive the predetermined products.

Although various embodiments of the present invention have been described with reference to a particular arrangement of parts, features and the like, these are not intended to exhaust all possible arrangements or features, and indeed many other embodiments, modifications and variations will be ascertainable to those of skill in the art.

What is claimed is:

1. A system for gathering data concerning exposure of an individual to
    predetermined products and usage of a publication thereby, the system comprising a portable monitor capable of being carried on the person of the individual, the portable monitor comprising a product exposure monitor and a publication usage monitor, wherein the publication usage monitor gathers data indicating at least one of grasping of the publication, turning a page of the publication, and flexing a page of the publication.

2. The system of claim 1, wherein the publication usage monitor gathers data indicating usage of at least one publication by the individual.

3. A system for gathering data concerning presence of an individual within a
    commercial establishment and usage of a publication thereby, the system comprising a portable monitor capable of being carried on the person of the individual, the portable monitor comprising a commercial establishment presence detection monitor and a publication usage monitor, wherein the publication usage monitor gathers data indicating at least one of grasping of the publication, turning a page of the publication, and flexing a page of the publication.

4. The system of claim 3, wherein the portable monitor comprises a product exposure monitor.

5. The system of claim 3, wherein the publication usage monitor gathers data indicating usage of at least one publication by the individual.

6. A method of gathering data concerning exposure of an individual to a product and usage of a publication thereby, comprising:
    gathering data indicating exposure of the individual to at least one product with the use of a portable monitor carried on the person of the individual, and
    gathering data indicating usage of at least one publication by the individual with the use of the portable monitor, wherein gathering data indicating usage of at least one publication comprises gathering data indicating at least one of grasping of the publication, turning a page of the publication, and flexing a page of the publication.

7. A method of gathering data concerning presence of an individual within a commercial establishment and usage of a publication thereby, comprising:
    gathering data indicating presence of the individual within at least one commercial establishment with the use of a portable monitor carried on the person of the individual, and
    gathering data indicating usage of at least one publication by the individual with the use of the portable monitor, wherein gathering data indicating usage of at least one publication comprises gathering data indicating at least one of grasping of the publication, turning a page of the publication, and flexing a page of the publication.

8. The method of claim 7, comprising gathering data indicating exposure of the individual to at least one product with the use of a portable monitor carried on the person of an individual.

* * * * *